US012537065B2

(12) United States Patent
Prakash et al.

(10) Patent No.: US 12,537,065 B2
(45) Date of Patent: Jan. 27, 2026

(54) REDUCING TIME-TAG READ ERRORS WITH RESPECT TO NON-VOLATILE MEMORY STRUCTURES

(71) Applicant: Western Digital Technologies, Inc., San Jose, CA (US)

(72) Inventors: Abhijith Prakash, Milpitas, CA (US); Xiang Yang, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 9 days.

(21) Appl. No.: 18/219,413

(22) Filed: Jul. 7, 2023

(65) Prior Publication Data

US 2024/0185928 A1 Jun. 6, 2024

Related U.S. Application Data

(60) Provisional application No. 63/430,130, filed on Dec. 5, 2022.

(51) Int. Cl.
*G11C 16/26* (2006.01)
*G06F 3/06* (2006.01)
*G11C 16/04* (2006.01)
*G11C 16/08* (2006.01)

(52) U.S. Cl.
CPC ............ *G11C 16/26* (2013.01); *G06F 3/0619* (2013.01); *G06F 3/0658* (2013.01); *G06F 3/0679* (2013.01); *G11C 16/0483* (2013.01); *G11C 16/08* (2013.01)

(58) Field of Classification Search
CPC ..... G11C 16/26; G11C 16/0483; G11C 16/08; G11C 11/5642; G06F 3/0619; G06F 3/0658; G06F 3/0679
See application file for complete search history.

(56) References Cited

U.S. PATENT DOCUMENTS

| | | |
|---|---|---|
| 9,229,806 B2 | 1/2016 | Mekhanik |
| 9,633,749 B2 | 4/2017 | Alrod |
| 9,672,940 B1 | 6/2017 | Reusswig |
| 9,761,308 B1 | 9/2017 | Cometti |

(Continued)

FOREIGN PATENT DOCUMENTS

CN 101727983 A * 6/2010 ......... G11C 11/5628

*Primary Examiner* — Masud K Khan
(74) *Attorney, Agent, or Firm* — Dickinson Wright PLLC

(57) ABSTRACT

A method for performing a read operation of a fully programmed non-volatile memory that, initially, was partially programmed, the method comprising: selecting a word line within an initially programmed portion; applying a read to the selected word line, determining a first "optimal" read verify voltage level for each program state; once fully programmed, applying a read to the selected word line, determining a second "optimal" read verify voltage level for each program state; for each program state, determining a difference between the first "optimal" read verify voltage level and the second "optimal" read verify voltage level, the difference defining a supplemental offset value; determining an "optimal" read verify voltage level for each program state by applying the supplemental offset value in conjunction with an initial offset value defined in a pre-calibrated "lookup" table; and applying a read to each word line according to each determined "optimal" read verify voltage level.

17 Claims, 24 Drawing Sheets

(56) References Cited

U.S. PATENT DOCUMENTS

| | | |
|---|---|---|
| 10,268,404 B2 | 4/2019 | Alhussien |
| 10,614,881 B2 | 4/2020 | Papandreou |
| 11,983,422 B1* | 5/2024 | Proulx ................... G11C 16/20 |
| 2019/0088312 A1* | 3/2019 | Shiino ................. G11C 11/5642 |
| 2021/0020254 A1* | 1/2021 | Kim ....................... G11C 16/26 |
| 2021/0225450 A1* | 7/2021 | Park ................... G11C 16/3459 |

* cited by examiner

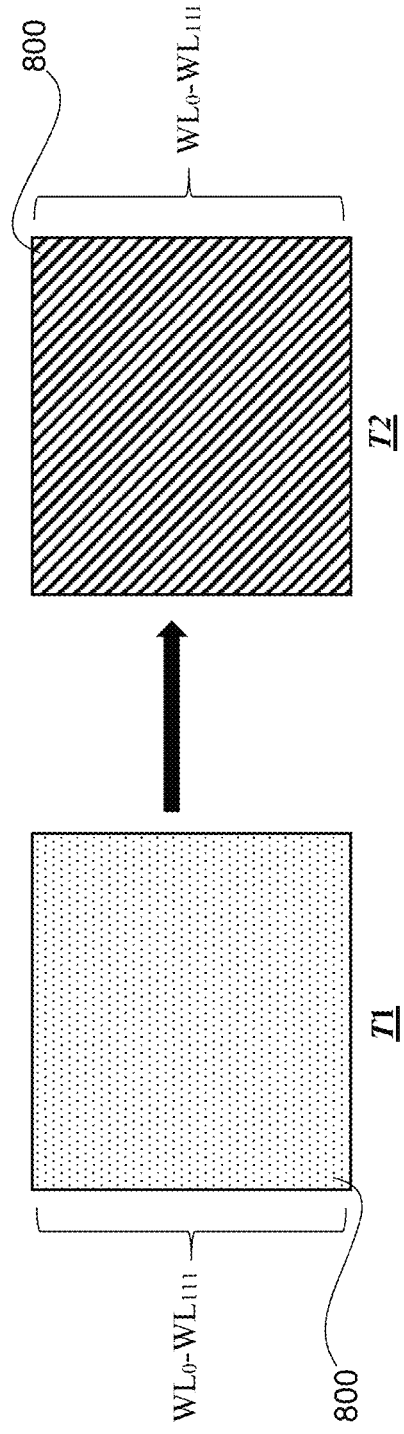

FIG. 17

| Wordline Zone | Wordline Range within Zone | A-State Read Offset | B-State Read Offset | C-State Read Offset | D-State Read Offset | E-State Read Offset | F-State Read Offset | G-State Read Offset |
|---|---|---|---|---|---|---|---|---|
| 0 | WL₀ | Δ_{A0} | Δ_{B0} | Δ_{C0} | Δ_{D0} | Δ_{E0} | Δ_{F0} | Δ_{G0} |
| 1 | WL₁-WL₂₀ | Δ_{A1} | Δ_{B1} | Δ_{C1} | Δ_{D1} | Δ_{E1} | Δ_{F1} | Δ_{G1} |
| 2 | WL₂₁-WL₃₀ | Δ_{A2} | Δ_{B2} | Δ_{C2} | Δ_{D2} | Δ_{E2} | Δ_{F2} | Δ_{G2} |
| 3* | WL₃₁-WL₄₄* | 0* | 0* | 0* | 0* | 0* | 0* | 0* |
| 4 | WL₄₅ | Δ_{A4} | Δ_{B4} | Δ_{C4} | Δ_{D4} | Δ_{E4} | Δ_{F4} | Δ_{G4} |
| 5 | WL₄₆-WL₅₅ | Δ_{A5} | Δ_{B5} | Δ_{C5} | Δ_{D5} | Δ_{E5} | Δ_{F5} | Δ_{G5} |
| 6 | WL₅₆-WL₆₅ | Δ_{A6} | Δ_{B6} | Δ_{C6} | Δ_{D6} | Δ_{E6} | Δ_{F6} | Δ_{G6} |
| 7 | WL₆₆-WL₇₅ | Δ_{A7} | Δ_{B7} | Δ_{C7} | Δ_{D7} | Δ_{E7} | Δ_{F7} | Δ_{G7} |
| 8 | WL₇₆-WL₁₁₁ | Δ_{A8} | Δ_{B8} | Δ_{C8} | Δ_{D8} | Δ_{E8} | Δ_{F8} | Δ_{G8} |

*Reference WL

FIG. 18

| Wordline Zone | Wordline Range within Zone | A-State Read Offset | B-State Read Offset | C-State Read Offset | D-State Read Offset | E-State Read Offset | F-State Read Offset | G-State Read Offset |
|---|---|---|---|---|---|---|---|---|
| 0 | $WL_0$ | $\Delta_{A0}$ | $\Delta_{B0}$ | $\Delta_{C0}$ | $\Delta_{D0}$ | $\Delta_{E0}$ | $\Delta_{F0}$ | $\Delta_{G0}$ |
| 1 | $WL_1$-$WL_{10}$ | $\Delta_{A1}$ | $\Delta_{B1}$ | $\Delta_{C1}$ | $\Delta_{D1}$ | $\Delta_{E1}$ | $\Delta_{F1}$ | $\Delta_{G1}$ |
| 2 | $WL_{11}$-$WL_{30}$ | $\Delta_{A2}$ | $\Delta_{B2}$ | $\Delta_{C2}$ | $\Delta_{D2}$ | $\Delta_{E2}$ | $\Delta_{F2}$ | $\Delta_{G2}$ |
| 3* | $WL_{31}$-$WL_{54}$* | 0* | 0* | 0* | 0* | 0* | 0* | 0* |
| 4 | $WL_{55}$ | $\Delta_{A4}$ | $\Delta_{B4}$ | $\Delta_{C4}$ | $\Delta_{D4}$ | $\Delta_{E4}$ | $\Delta_{F4}$ | $\Delta_{G4}$ |
| 5 | $WL_{56}$-$WL_{75}$ | $\Delta_{A5}$ | $\Delta_{B5}$ | $\Delta_{C5}$ | $\Delta_{D5}$ | $\Delta_{E5}$ | $\Delta_{F5}$ | $\Delta_{G5}$ |
| 6 | $WL_{76}$-$WL_{95}$ | $\Delta_{A6}$ | $\Delta_{B6}$ | $\Delta_{C6}$ | $\Delta_{D6}$ | $\Delta_{E6}$ | $\Delta_{F6}$ | $\Delta_{G6}$ |
| 7 | $WL_{96}$-$WL_{110}$ | $\Delta_{A7}$ | $\Delta_{B7}$ | $\Delta_{C7}$ | $\Delta_{D7}$ | $\Delta_{E7}$ | $\Delta_{F7}$ | $\Delta_{G7}$ |
| 8 | $WL_{111}$ | $\Delta_{A8}$ | $\Delta_{B8}$ | $\Delta_{C8}$ | $\Delta_{D8}$ | $\Delta_{E8}$ | $\Delta_{F8}$ | $\Delta_{G8}$ |

900

| Wordline Range | A-State Read Offset | B-State Read Offset | C-State Read Offset | D-State Read Offset | E-State Read Offset | F-State Read Offset | G-State Read Offset |
|---|---|---|---|---|---|---|---|
| $WL_0$-$WL_k$* | $\Delta_A$ | $\Delta_B$ | $\Delta_C$ | $\Delta_D$ | $\Delta_E$ | $\Delta_F$ | $\Delta_G$ |
| $WL_{k+1}$-$WL_{111}$ | 0 | 0 | 0 | 0 | 0 | 0 | 0 |

910
912

*Selected $WL_k$

FIG. 22

REDUCING TIME-TAG READ ERRORS WITH RESPECT TO NON-VOLATILE MEMORY STRUCTURES

CROSS-REFERENCE TO RELATED APPLICATIONS

This application claims the benefit of U.S. Provisional Application No. 63/430,130, filed on Dec. 5, 2022. The entire disclosure of the application referenced above is incorporated herein by reference.

TECHNICAL FIELD

This disclosure relates to non-volatile memory storage systems in solid-state drives or other devices, including but not limited to flash drives or embedded/removable flash packages. More specifically, this disclosure relates to systems and methods for reducing the fail bit count (FBC) read errors that may occur during a time-tag read memory operation once a partially programmed open memory block of a non-volatile memory structure then becomes a fully programmed closed memory block.

BACKGROUND

Due to emerging technology and market forces, solid-state drives (SSDs) are steadily replacing previously conventional data storage systems that rely on the rotation of magnetic mediums for reading and writing data (e.g., hard disk drives). Rather than comprising any mechanical or moving parts, solid-state memory comprises integrated circuit assemblies or interconnected flash components to provide non-volatile storage in which stored data can be persistently retained even during a planned or unplanned interruption of power. As a result, a solid-state drive is inherently faster and more robust (i.e., less susceptible to data loss and corruption), as well as consumes less power and is more compact in comparison to disk-based storage. Accordingly, non-volatile memory is a powerful storage solution with respect to many types of computing, consumer electronic, and stand-alone external storage (e.g., USB drives) devices. Advances in non-volatile memory structures have led to significant increases in their storage density capability and a reduction in their power consumption, thereby lowering the per-bit and bit-per-chip cost.

Generally, a non-volatile memory device may be comprised of one or more arrays of individual memory cells. With respect to some flash memory types, each memory cell is comprised of a floating gate that is positioned above and isolated from a channel region of a semiconductor substrate, wherein the floating gate is positioned between the source and drain regions. Also, a control gate is provided over and isolated from the floating gate, wherein a threshold voltage ($V_{th}$) of the memory cell transistor is controlled by and dependent upon the amount of charge that is retained on the transistor's floating gate. Specifically, in a switch-like manner, a minimum amount of voltage that must be applied to the control gate of the transistor before the transistor is activated to permit conduction between its source and drain regions is, therefore, determined by the level of charge being retained on the floating gate. As a result, bit-value data can be programmed onto and erased from the cell by precisely changing the level of charge on the floating gate in order to change the threshold voltage ($V_{th}$) characteristic of the transistor. In an array structure, the memory cells are addressable by word lines (rows) and bit lines (columns). One type of non-volatile memory storage defined by this general structure is referred to as NAND flash memory based upon its electrical characteristics, which resemble a NAND logic gate.

As explained in detail below, the number of bits that can be stored in an individual memory cell is dependent upon the number of distinct voltage ranges that may be partitioned within the threshold voltage ($V_{th}$) window of that memory cell. For example, to store one bit of data (referred to as a binary data), the possible threshold voltage ($V_{th}$) of a memory cell can be divided into two voltage ranges, wherein the ranges are assigned as logical data "1" and "0" respectively. Accordingly, a memory cell of this storage density order may be referred to as a "single-level cell" or SLC.

By further partitioning the threshold voltage ($V_{th}$) window of a memory cell into additional distinct voltage ranges, multiple levels of information may be stored. A memory cell of this storage density order may be referred to as a "multi-state cell" or MLC. For example, in order to store two bits of data, the threshold voltage ($V_{th}$) window of a cell can be further partitioned into four distinct voltage ranges, with each range assigned a bit value equal to, for example, "11," "10," "01," and "00." Accordingly, following an erase operation, the cell's threshold voltage ($V_{th}$) is negative, which could be defined as logic "11." As such, the positive threshold voltages ($V_{th}$) can be used for the programmed states of "10," "01," and "00." In a further example, to store three bits of data, the threshold voltage ($V_{th}$) window of a cell may be partitioned into eight distinct voltage ranges, with each range assigned a bit value equal to, for example, "111," "110," "100," "010," "011," "000," "001," and "101." A memory cell of this storage density order may be referred to as a "tri-level," "triple-level cell," or TLC. In a further example, to store four bits of data, the voltage threshold window of a memory cell may be partitioned into 16 distinct voltage ranges (or states), wherein each voltage range is assigned a certain bit value that is equal to, for example, "1111," "1110," "1100," "1000," "0111," "0011," "0001," "0000," "0001," "1001," "1101," "1011," "0110," "0100," "0101," and "1010." A memory cell of this type of storage density may be referred to, for example, as a "quad-level cell" (QLC).

The specific relationship between the data programmed into a memory cell and the threshold voltage ($V_{th}$) levels of the memory cell depends on the data encoding pattern or data scheme adopted for the memory cells.

In addition to the increasing storage densities with respect to a single memory cell, advances in non-volatile memory array structures have led to memory cells being stacked in a vertical direction with respect to the semiconductor substrate, thus creating a three-dimensional array structure as opposed to a planar two-dimensional array structure.

Accordingly, as the industry continues to achieve smaller sized memory cells with increased storage densities in order to store more data, this scaling of size entails certain performance and durability risks. In order to achieve the advantage of higher memory capacity for a fixed die size, smaller memory cells must be packed more closely together. Doing so, however, may bring about an increased number of memory operation and performance errors. Such errors may be due to, for example, physical variations within the memory structure that inherently transpire, or are unintentionally introduced, as a result of the manufacturing or the fabrication process. In another example, due to the electrical behavior and, under certain circumstances, the mobile nature of electrons that are retained at the floating gate or charge trapping layer of programmed memory cells, electron interference as a result of, for example, electrical fringing effects or electrostatic coupling, can occur between neighboring memory elements following a programming operation, thereby problematically skewing the threshold voltage ($V_{th}$) distribution of a memory cell. Also, as time elapses, a programmed memory cell may experience a lateral shifting in the threshold voltage ($V_{th}$) distributions of its programmed charge states as the retained electrons diffuse or migrate from the memory cell, which then degrades the data retention of the programmed data.

To compensate for these types of disturbances or inaccuracies, various algorithmic methods exist for identifying, filtering and/or correcting noise and bit errors during the read operation and subsequent processing. However, these existing measures add complexity and latencies to the memory operations. In addition, these methods oftentimes lose their overall efficacy as the subject memory device undergoes multiple programming cycles, including instances in which a partially programmed memory structure (e.g., memory block) is fully programmed subsequently thereafter. Accordingly, there is a particular need for mitigation mechanisms that address these performance challenges irrespective of undergoing multiple programming cycles.

SUMMARY

Various embodiments include a method for performing a read memory operation with respect to a fully programmed memory structure that, initially, was partially programmed, the method comprising: (1) selecting a word line located within an initially programmed portion of a non-volatile memory structure, (2) applying a read memory algorithm with respect to the selected word line to determine a first "optimal" read verify voltage level for each program state that is associated with the selected word line, (3) once the memory structure is fully programmed, applying a read memory algorithm with respect to the selected word line in order to determine a second "optimal" read verify voltage level for each program state associated with the selected word line, (4) for each program state associated with the selected word line, determining a difference between the first "optimal" read verify voltage level and the second "optimal" read verify voltage level, wherein the difference defines a supplemental offset value, (5) determining an "optimal" read verify voltage level for each program state associated with each word line located within the initially programmed portion of the memory structure, wherein the "optimal" read verify voltage level is determined by applying the supplemental offset value in conjunction with an initial offset value defined in a pre-calibrated "lookup" table, and (6) applying a read memory operation with respect to each word line that is located within the initially programmed portion of the memory structure, wherein the read memory operation is applied according to each determined "optimal" read verify voltage level. According to certain embodiments, the non-volatile memory structure comprises NAND-type memory cells. Further, according to certain embodiments, the memory structure comprises the initially programmed portion and a later programmed portion and the method further comprises: (i) determining an "optimal" read verify voltage level for each program state associated with each word line located within the later programmed portion of the memory structure, wherein the "optimal" read verify voltage level is determined by applying only the initial offset value, and (ii) applying a read memory operation with respect to each word line located within the later programmed portion of the memory structure, wherein the read memory operation is applied according to each determined "optimal" read verify voltage level. Additionally, according to certain embodiments, the read memory algorithm comprises a bit count scan. Furthermore, according to certain embodiments, the first and second "optimal" read verify voltage levels are determined, according to the bit count scan, by sweeping, with respect to each program state, a corresponding threshold voltage ($V_{th}$) distribution curve to detect a lowermost region of the curve. In addition, according to certain embodiments, each corresponding threshold voltage ($V_{th}$) distribution curve comprises an unintended voltage shift. Further, according to certain embodiments, the selected word line is selected based at least in part on a relative location of the selected word line within the memory structure.

Other embodiments include a memory controller comprising: (1) a communication pathway that is configured to couple to a fully programmed non-volatile memory structure that, initially, was partially programmed, and (2) the memory controller is configured to: (i) select a word line that is located within an initially programmed portion of the non-volatile memory structure, (ii) apply a read memory algorithm with respect to the selected word line in order to determine a first "optimal" read verify voltage level for each program state that is associated with the selected word line, (iii) once the memory structure is fully programmed, apply a read memory algorithm with respect to the selected word line to determine a second "optimal" read verify voltage level for each program state that is associated with the selected word line, (iv) for each program state associated with the selected word line, determine a difference between the first "optimal" read verify voltage level and the second "optimal" read verify voltage level, wherein the difference defines a supplemental offset value, (v) determine an "optimal" read verify voltage level for each program state associated with each word line located within the initially programmed portion of the memory structure, wherein the "optimal" read verify voltage value is determined by applying the supplemental offset value in conjunction with an initial offset value defined in a pre-calibrated "lookup" table, and (vi) apply a read memory operation with respect to each word line located within the initially programmed portion of the memory structure, wherein the read memory operation is applied according to each determined "optimal" read verify voltage level. Further, according to certain embodiments, the non-volatile memory structure comprises NAND-type memory cells. Further, according to certain embodiments, the memory structure comprises the initially programmed portion and a later programmed portion, wherein the memory controller is further configured to: (a) determine an "optimal" read verify voltage level for each program state associated with each word line located within the later programmed portion of the memory structure, wherein the "optimal" read verify voltage level is determined by applying only the initial offset value, and (b) apply a read memory operation with respect to each word line located within the later programmed portion of the memory structure, wherein the read memory operation is applied according to each determined "optimal" read verify voltage level. In addition, according to certain embodiments, the read memory algorithm comprises a bit count scan. Additionally, according to certain embodiments, the first and second "optimal" read verify voltage levels are determined, according to the bit count scan, by sweeping, with respect to each program state, a corresponding threshold voltage ($V_{th}$) distribution curve to detect a lowermost region of the curve. Furthermore, according to certain embodiments, each corresponding threshold voltage ($V_{th}$) distribution curve comprises an unintended voltage shift. In addition, the selected word line is selected based at least in part on a relative location of the selected word line within the memory structure.

Additional embodiments include a non-volatile memory system that comprises: (1) a fully programmed memory structure comprising a population of NAND-type memory cells, wherein the memory structure was initially partially programmed, and (2) a memory controller coupled to the memory structure and: (i) selecting a word line located within an initially programmed portion of the memory structure, (ii) applying a read memory algorithm with respect to the selected word line to determine a first "optimal" read verify voltage level for each program state associated with the selected word line, (iii) once the memory structure is fully programmed, applying a read memory algorithm with respect to the selected word line to determine a second "optimal" read verify voltage level for each program state associated with the selected word line, (iv) for each program state associated with the selected word line, determining a difference between the first "optimal" read verify voltage level and the second "optimal" read verify voltage level, wherein the difference defines a supplemental offset value, (v) determining an "optimal" read verify voltage level for each program state associated with each word line located within the initially programmed portion of the memory structure, wherein the "optimal" read verify voltage level is determined by applying the supplemental offset value in conjunction with an initial offset value defined in a pre-calibrated "lookup" table, and (vi) applying a read memory operation with respect to each word line located within the initially programmed portion of the memory structure, wherein the read memory operation is applied according to each determined "optimal" read verify voltage level. Further, according to certain embodiments, the memory structure comprises the initially programmed portion and a later programmed portion, and the memory controller: (a) determining an "optimal" read verify voltage level for each program state associated with each word line located within the later programmed portion of the memory structure, wherein the "optimal" read verify voltage level is determined by applying only the initial offset value, and (b) applying a read memory operation with respect to each word line located within the later programmed portion of the memory structure, wherein the read memory operation is applied according to each determined "optimal" read verify voltage level. Further, according to certain embodiments, the read memory algorithm comprises a bit count scan. Additionally, according to certain embodiments, the first and second "optimal" read verify voltage levels are determined, according to the bit count scan, by sweeping, with respect to each program state, a corresponding threshold voltage ($V_{th}$) distribution curve to detect a lowermost region of the curve. Further, according to certain embodiments, each corresponding threshold voltage ($V_{th}$) distribution curve comprises an unintended voltage shift. Further, according to certain embodiments, the selected word line is selected based at least in part on a relative location of the selected word line within the memory structure.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope, the disclosure is described and explained with added specificity and detail through the use of the accompanying drawings in which:

FIG. 17 depicts a fully programmed memory block that, after a period of time, has experienced an unintended voltage shift ($\Delta V$) with respect to intended threshold voltage ($V_{th}$) distributions thereof, in accordance with exemplary embodiments;

FIG. 18 depicts a pre-calibrated "lookup" table or chart that indicates, with respect to each program state associated with each word line of a memory structure, an offset value to be applied when determining an "optimal" read verify voltage level for that program state, in accordance with exemplary embodiments;

FIG. 22 depicts a supplemental "lookup" table or chart resulting from applying the process set forth in FIG. 19 to the memory block that is depicted in FIG. 20, in accordance with exemplary embodiments;

DETAILED DESCRIPTION

Figure 1:
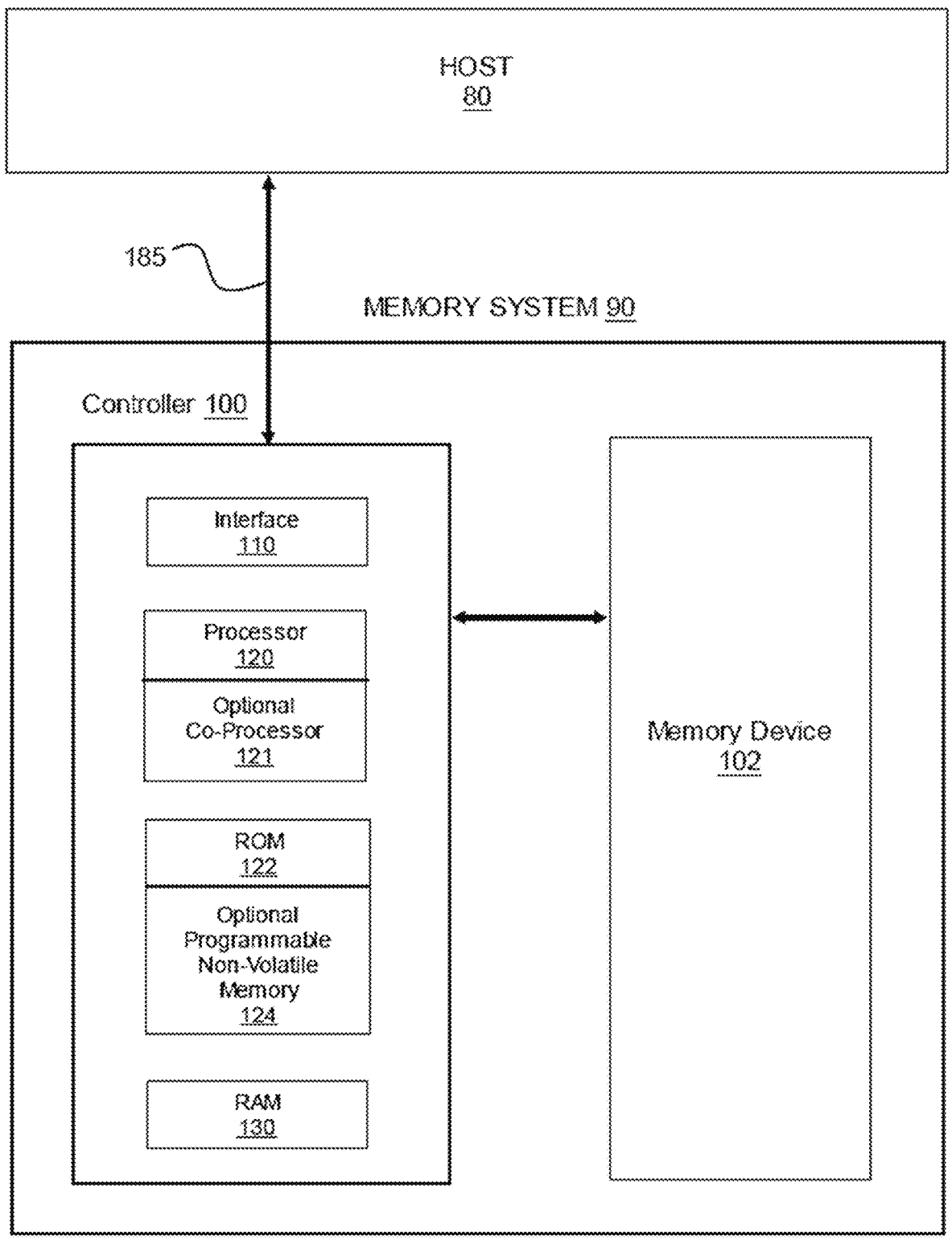
FIG. 1 is a block diagram of a memory system, in accordance with exemplary embodiments.

The following description is directed to various exemplary embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the detailed explanation of any specific embodiment is meant only to be exemplary of that embodiment and is not intended to suggest that the scope of the disclosure, including the claims, is limited to that particular embodiment.

The several aspects of the present disclosure may be embodied in the form of an apparatus, system, method, or computer program process. Therefore, aspects of the present disclosure may be entirely in the form of a hardware embodiment or a software embodiment (including but not limited to firmware, resident software, micro-code, or the like), or may be a combination of both hardware and software components that may generally be referred to collectively as a "circuit," "module," "apparatus," or "system." Further, various aspects of the present disclosure may be in the form of a computer program process that is embodied, for example, in one or more non-transitory computer-readable storage media storing computer-readable and/or executable program code.

Additionally, various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that comprises customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it comprises one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Thus, methods and means for these functions are described herein. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Further, the terms "program," "software," "software application," and the like as used herein, refer to a sequence of instructions designed for execution on a computer-implemented system. Accordingly, a "program," "software," "application," "computer program," or "software application" may include a subroutine, a function, a procedure, an object method, an object implementation, an executable application, an applet, a servlet, a source code, an object code, a shared library/dynamic load library and/or other sequence of specific instructions designed for execution on a computer system.

Additionally, the terms "couple," "coupled," or "couples," where used herein, are intended to mean either a direct or an indirect connection. Thus, if a first device couples, or is coupled to, a second device, that connection may be by way of a direct connection or through an indirect connection via other devices (or components) and connections.

Regarding the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that comprises the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or mores," "ones or more," and/or "ones or mores" according to set theory, unless expressly specified otherwise.

Various elements of the present disclosure are described below with reference to schematic flowchart diagrams and/or schematic block diagrams depicting methods, apparatuses, systems, and computer program processes according to exemplary embodiments of the present disclosure, wherein each block, or combinations of blocks, of the schematic flowchart and/or schematic block diagrams, can be implemented by specifically written computer program instructions. As is understood in the art, the computer program instructions are executed by a designated processor of a computer or other programmable data processing apparatus, thereby creating the mechanisms for implementing the functions, acts, and/or operations specifically set forth in the one or more blocks of the schematic flowchart and/or schematic block diagrams. Further, it is noted that, in certain alternative process implementations, the functions specified in a block may occur out of the precise order depicted in the schematic flowchart and/or block diagrams. For example, two blocks depicted in the diagram as occurring in succession may, in fact, be executed substantially at the same time (i.e., concurrently), or even executed in a reverse order, depending upon the functionality involved. In addition, other process steps and methods that are equivalent in function, logic, or effect to one or more blocks, or portions thereof, of the diagrams may be conceived and are contemplated as being within the scope of the present disclosure. Furthermore, although the schematic diagrams may depict various arrow types and directions and line types as a matter of illustration, they are not intended to limit the scope of corresponding embodiments. For instance, an arrow may represent or signify a waiting or monitoring period of unspecified duration between enumerated steps of the depicted exemplary embodiment.

In the detailed description that follows, reference is made to the appended drawings, which form a part thereof. It is recognized that the foregoing summary is illustrative only and is not intended to be limiting in any manner. In addition to the illustrative aspects, example embodiments, and features described above, additional aspects, exemplary embodiments, and features will become apparent by reference to the drawings and the detailed description below. The description of elements in each figure may refer to elements of proceeding figures. Like reference numerals may refer to like elements in the figures, including alternate exemplary embodiments of like elements.

Referring now to the drawings in detail and beginning with FIG. 1, there is depicted an exemplary embodiment of a memory system 90 and is an illustration of its main hardware components. In this particular embodiment, the memory system 90 operates and is in communication with a host device 80 through a host interface. Further, the memory system 90 comprises a memory device 102 whose operations are controlled by a controller 100. The host device 80 may comprise any device or system that utilizes the memory system 90 (e.g., a computing device). Accordingly, the memory system 90 may be in the form of a removable memory card or an embedded memory system. For example, the memory system 90 may be embedded in a solid-state drive that is installed in a laptop computer. In another example, the memory system 90 may be embedded within the host device 80 such that the host 80 and the memory system 90 (including controller 100) are formed on a single integrated circuit chip. In embodiments in which the memory system 90 is implemented within a memory card, the host device 80 may include a built-in receptacle for the one or more types of memory cards or flash drives (e.g., a universal serial bus (USB) port, or a memory card slot). Further, the host 80 may use adapters in which a memory card is plugged.

Still referring to FIG. 1, as described in detail below, the memory device 102 may comprise one or more memory arrays of a plurality of non-volatile memory cells that are distributed over one or more integrated circuit chips. And, in accordance with this particular embodiment, the controller 100 may include several components that may include, but are not limited to, interface circuits 110, a processor 120, ROM (read-only memory) 122, RAM (random access memory) 130, programmable non-volatile memory 124, and additional components. The controller 100 may, for example, be in the form of one or more application-specific integrated circuits (ASIC) in which the components included in such an ASIC generally depend on the particular application.

Figure 2:
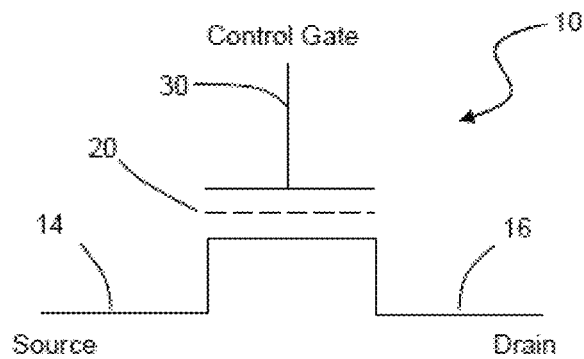
FIG. 2 is a schematic depiction of a non-volatile memory cell, in accordance with exemplary embodiments.

With respect to the memory device 102 itself, FIG. 2 is a schematic depiction of an individual non-volatile memory cell 10 in accordance with an exemplary embodiment. As is mentioned above, the memory cell 10 may be implemented by a field-effect transistor having a charge storage unit 20, such as a floating gate or a dielectric layer. In addition, the memory cell 10 comprises a source region 14 and a drain region 16. Further, a control gate 30 is positioned above the floating gate 20. Example types of non-volatile memory cells having this general structure include, but are not limited to, electrically erasable programmable read-only memory (EEPROM) and flash EEPROM, NAND (NOT-AND)-type cells, and memory devices utilizing dielectric storage elements (e.g., NROM™). In operation, the memory state of a cell (e.g., programmed or erased) may, in accordance with certain embodiments, be read by sensing the conduction current across the source and drain electrodes of the memory cell when a reference voltage is applied to the control gate 30. More specifically, for each given charge on the floating gate 20 of a memory cell, a corresponding conduction current with respect to a fixed reference control gate voltage may be detected. Accordingly, as is described above, the range of charges programmable onto the floating gate defines a corresponding threshold voltage window or a corresponding conduction current window of the memory cell 10. Alternatively, rather than detecting the conduction current among a partitioned current window, it is possible to set the threshold voltage for a given memory state under test at the control gate 30 and detect if the resulting conduction current is higher than or lower than a threshold current (i.e., a cell-read reference current). In one such exemplary implementation, detection of the conduction current relative to a threshold current is accomplished by examining a discharge rate of the conduction current through the capacitance of the bit line.

Figure 3:
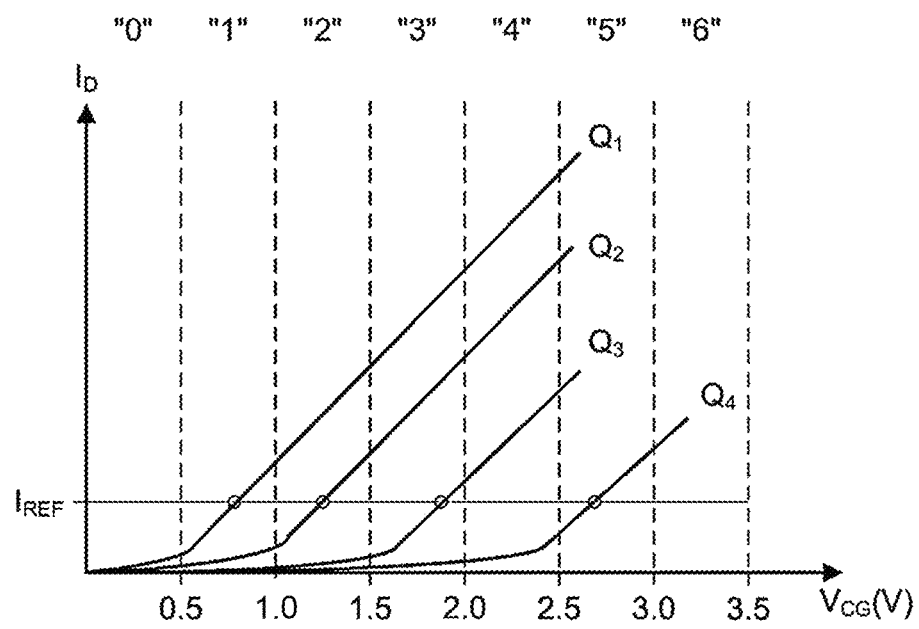
FIG. 3 depicts the relationship between a source-drain current $I_D$ and a control gate voltage $V_{CG}$ for four different charges Q1-Q4 that a floating gate of a non-volatile memory cell may be selectively storing at any one time and at a fixed drain voltage, in accordance with exemplary embodiments.

FIG. 3 provides a graphical illustration of the correlation between the source-drain current $I_D$ and control gate voltage $V_{CG}$ for, for example, a non-volatile memory cell 10 having four different charge states Q1-Q4 that the floating gate may be selectively storing at any given time. As shown, with a fixed drain voltage bias, there exists four solid $I_D$ versus $V_{CG}$ curves representing four charge levels that can be programmed on a floating gate of the memory cell, wherein the four charge levels respectively correspond to four of eight possible memory states. Therefore, as an example, the threshold voltage window of a population of memory cells may range from 0.5 V to 3.5 V. In such an example, seven programmed memory states assigned as "0," "1," "2," "3," "4," "5," "6," respectively, and one erased state (which is not shown in FIG. 3), may be demarcated by partitioning the threshold window into regions at intervals of 0.5 V each. Accordingly, if a reference current, $I_{REF}$, of 2 µA is used as shown, then a cell programmed with Q1 voltage may be considered to be in a memory state "1" as its curve intersects with $I_{REF}$ in the region of the threshold window that is demarcated by the voltage range $V_{CG}$–0.5 V and 1.0 V. Similarly, Q4 is in a memory state "5."

Thus, as mentioned above, the more states that a memory cell 10 is made to store, the more finely divided is its threshold voltage window. For example, in a memory cell 10 that has a threshold voltage window ranging from –1.5 V to 5 V, thereby providing a possible maximum width of 6.5 V, and is to store 16 memory states, each state may only occupy a voltage range of from 200 mV to 300 mV. Such a narrow voltage range will require higher precision in programming and reading operations in order to achieve the required resolution.

Figure 4A:
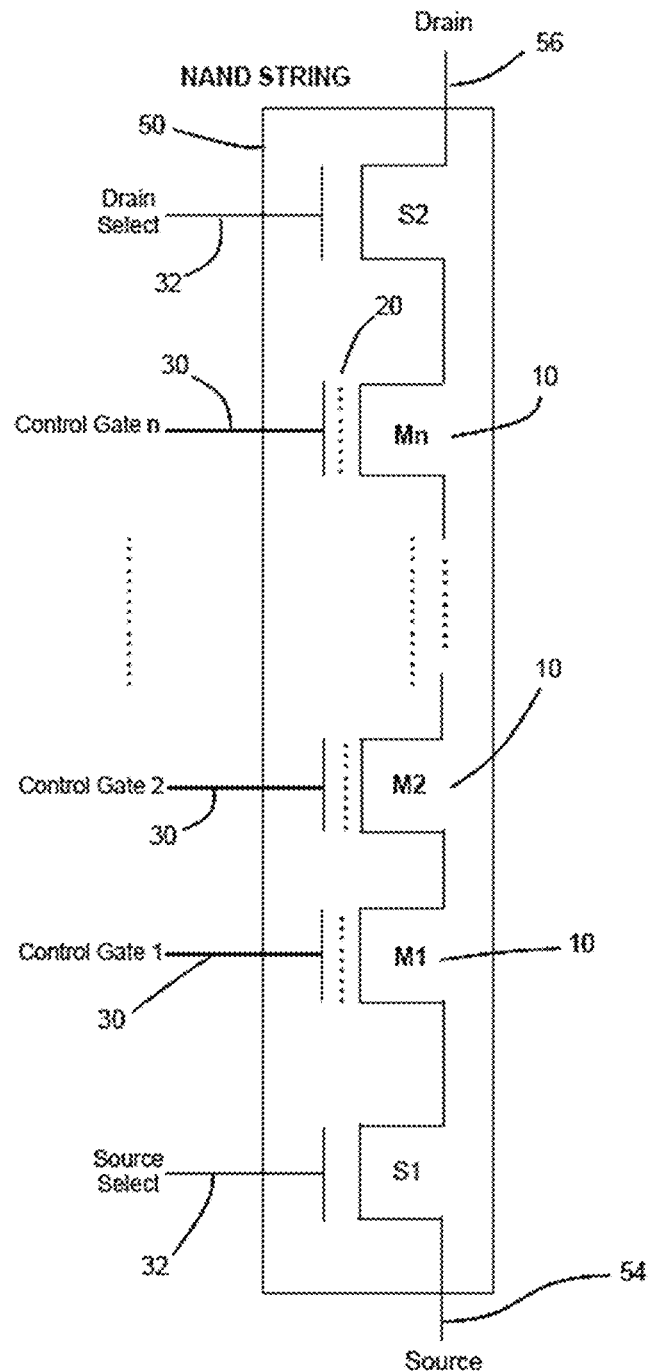
FIG. 4A schematically depicts a series of NAND-type memory cells that are organized into a string, in accordance with exemplary embodiments.

Individual memory cells 10 are organized into strings in which the memory cells are placed in series. For example, depicted in FIG. 4A is an exemplary embodiment of a string 50 comprising NAND-type memory cells in which the series of the cells' respective transistor elements M1, M2, . . . , Mn (wherein "n" may equal 4, 8, 16 or higher) are daisy-chained with respect to their sources and drains. Further, as discussed with respect to FIG. 3, each memory transistor 10 in the string 50 has a charge storage element 20 (e.g., a floating gate) for storing a certain amount of charge so as to represent an intended memory state of that cell. And, as explained in greater detail below, each memory transistor 10 comprises a control gate 30 that allows control over the read and write operations. Present at the source terminal 54 and drain terminal 56 of the string 50 are select transistors S1, S2 that control the transistor elements' connection to the outlying memory array. Specifically, when the source select transistor S1 is turned on, the source terminal 54 is coupled to a source line. Likewise, when the drain select transistor S2 is turned on, the drain terminal 56 is coupled to a bit line of the memory array.

Figure 4B:
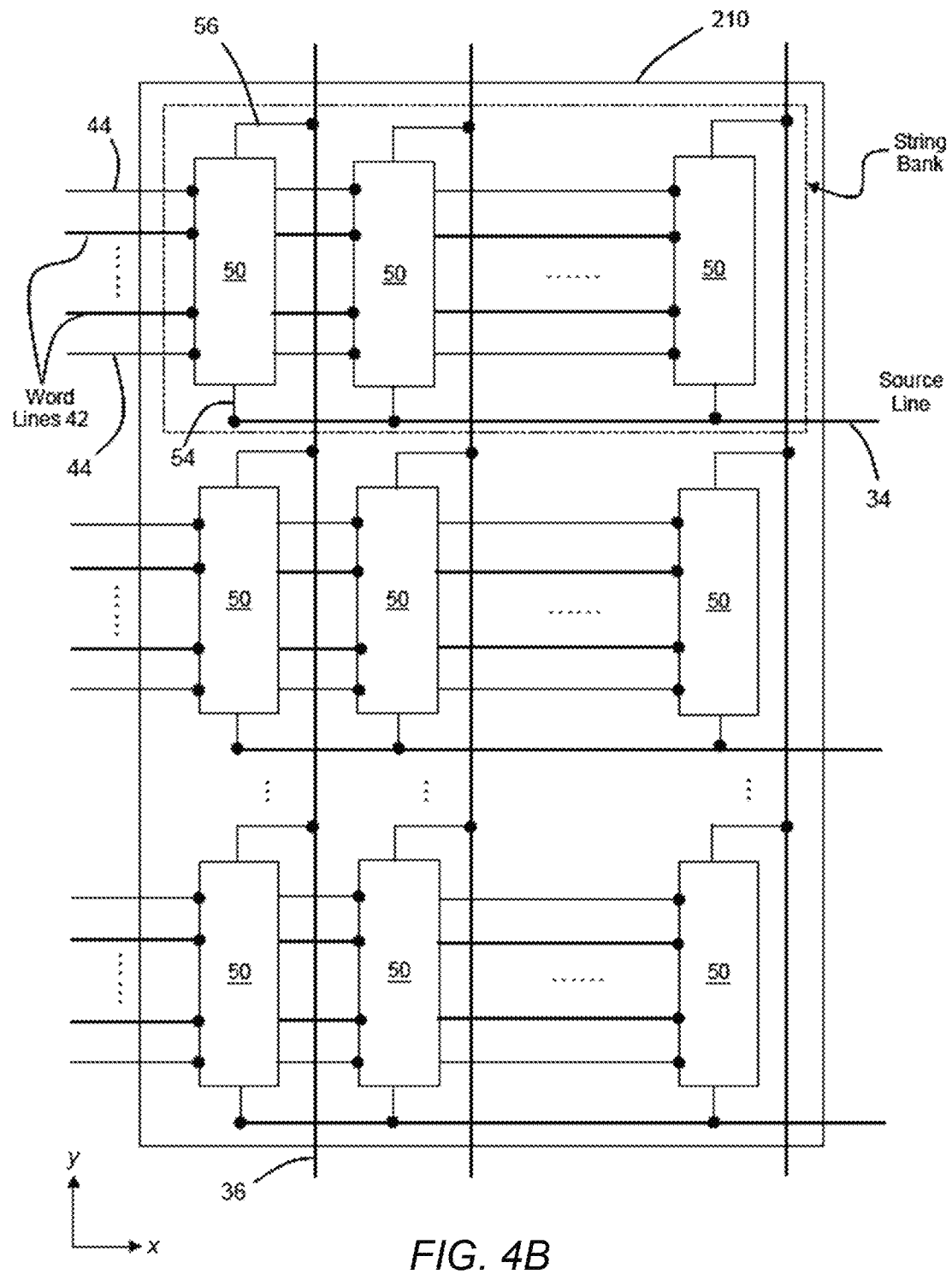
FIG. 4B schematically depicts an array of memory cells, comprising a plurality of NAND-type strings, such as the type depicted in FIG. 4A, in accordance with exemplary embodiments.

Expanding outward a hierarchical level, FIG. 4B is a schematic diagram depicting an exemplary embodiment of a memory array 210 comprised of a plurality of NAND strings 50 of the type illustrated in FIG. 4A. Along each column of NAND strings 50, a bit line 36 is coupled to the drain terminal 56 of each NAND string. In addition, along each bank of NAND strings 50, a source line 34 is coupled to the source terminals 54 of each NAND string. Further, the control gates 30 of the memory transistors 10 in a row of memory cells in the bank of NAND strings 50 are connected to the same word line 42. Accordingly, when an addressed memory transistor 10 within a NAND string 50 is read or verified during a programming operation, an appropriate voltage is applied to its control gate 30. Concurrently, the remaining non-addressed memory transistors 10 within the NAND string 50 are fully turned on by applying a sufficient voltage to their respective control gates 30. As a result, a conductive pathway is created from the source of the addressed memory transistor 10 to the source terminal 54 of NAND string 50, and from the drain of the addressed memory transistor 10 to the drain terminal 56 of the cell.

Further, the control gates 32 of the select transistors S1, S2 of each NAND string 50 in the memory array 210 provide control access to the NAND string at its source terminal 54 and drain terminal 56. The control gates 32 of the select transistors S1, S2 along a row in a bank of NAND strings 50 are connected to the same select line 44. Thus, an entire row of memory cells 10 in a bank of NAND strings 50 can be addressed by applying the appropriate voltages on the word lines 42 and select lines 44 of the bank of NAND strings 50.

Figure 5:
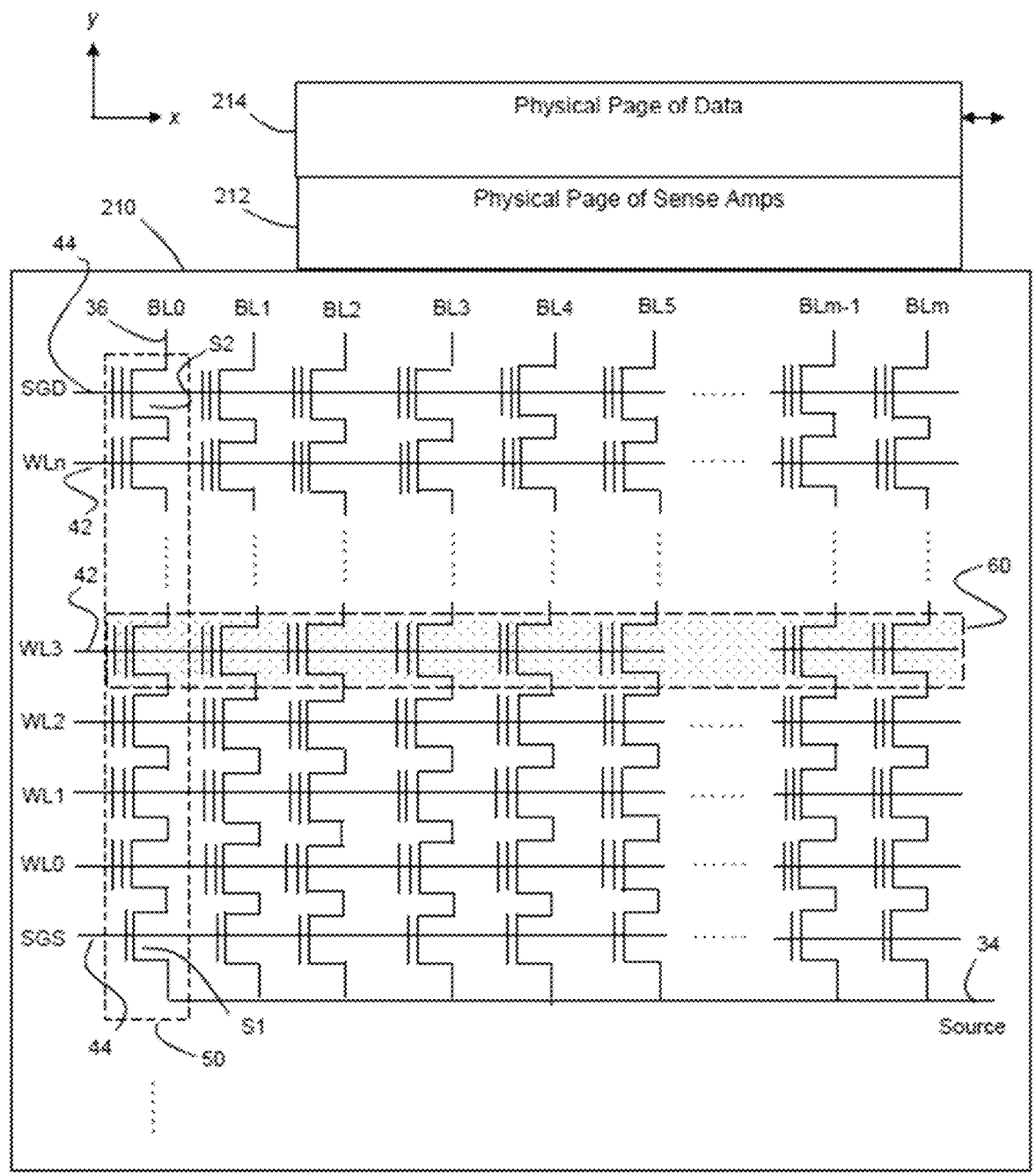
FIG. 5 depicts a page of memory cells being sensed or programmed in parallel, and in relation to a memory array organized in the NAND-type configuration, in accordance with exemplary embodiments.

Turning now to FIG. 5, there is depicted a detailed illustration of one bank of NAND strings 50 of a memory array 210 according to an exemplary embodiment thereof. This view is particularly useful in visualizing a row-by-row configuration of the memory array 210, wherein each row of the array 210 may be referred to as a "page." Accordingly, a physical page (such as programmed in parallel. In fact, a page is the smallest unit of the memory device that may be programmed or written to. Programming of a page is accomplished by a corresponding page of sense amplifiers 212, wherein each sense amplifier may be coupled to a respective NAND string 50 via a bit line (e.g., see respective bit lines BL0, BL1, BL2, BL3, BL4, BL5, . . . , BLm−1, and BLm illustrated in FIG. 5). Thus, a page 60 is enabled by the control gates of the plurality of memory cells 10 in page 60, which are connected to a common word line 42, and each memory cell 10 of the page 60 is accessible by a sense amplifier via a bit line 36. Therefore, when programming or sensing a page 60 of memory cells 10, a programming or sensing voltage is respectively applied to the common word line (e.g., word line WL3 with respect to the page 60) together with appropriate voltages on the bit lines.

Regarding the manner in which data is programmed and erased, it is important to note that, with respect to flash memory, a memory cell must be programmed from an erased state. In other words, a floating gate 20 must first be emptied of charge, thereby placing the memory cell in an erased state, before a programming operation can subsequently add a desired amount of charge back to the floating gate 20. Thus, the level of charge on a floating gate 20 cannot be incrementally increased or decreased from its previous programmed level. Therefore, it is not possible for update data to overwrite the existing data of a memory cell 10. Rather, the update data must be programmed to a previous unwritten location.

For purposes of promoting performance in erase operations, an array 210 of memory cells 10 is, for example, divided into a large number of blocks of memory cells, wherein a block is the smallest unit of the memory device in which the memory cells contained may be erased together. Furthermore, each block of memory cells 10 may be divided into a number of physical pages 60 wherein, as mentioned above, a programming operation is conducted page by page. Accordingly, a logical page is a unit of programming or reading that contains a number of bits equal to the number of memory cells 10 in a given physical page. For example, in a memory device of the SLC-type in which one bit of data is stored in each memory cell 10, one physical page 60 stores one logical page of data. Accordingly, in a memory device of the MLC-type in which two bits of data are stored in each memory cell 10, one physical page 60 can store two logical pages of data. As such, one or more logical pages of data are typically stored in one row (i.e., page 60) of memory cells. A page 60 can store one or more sectors wherein a sector is comprised of both user data and overhead data. In an exemplary embodiment, individual pages 60 may be divided into segments in which each segment contains the fewest number of memory cells 10 that may be written at one time in a basic programming operation.

Figure 6:
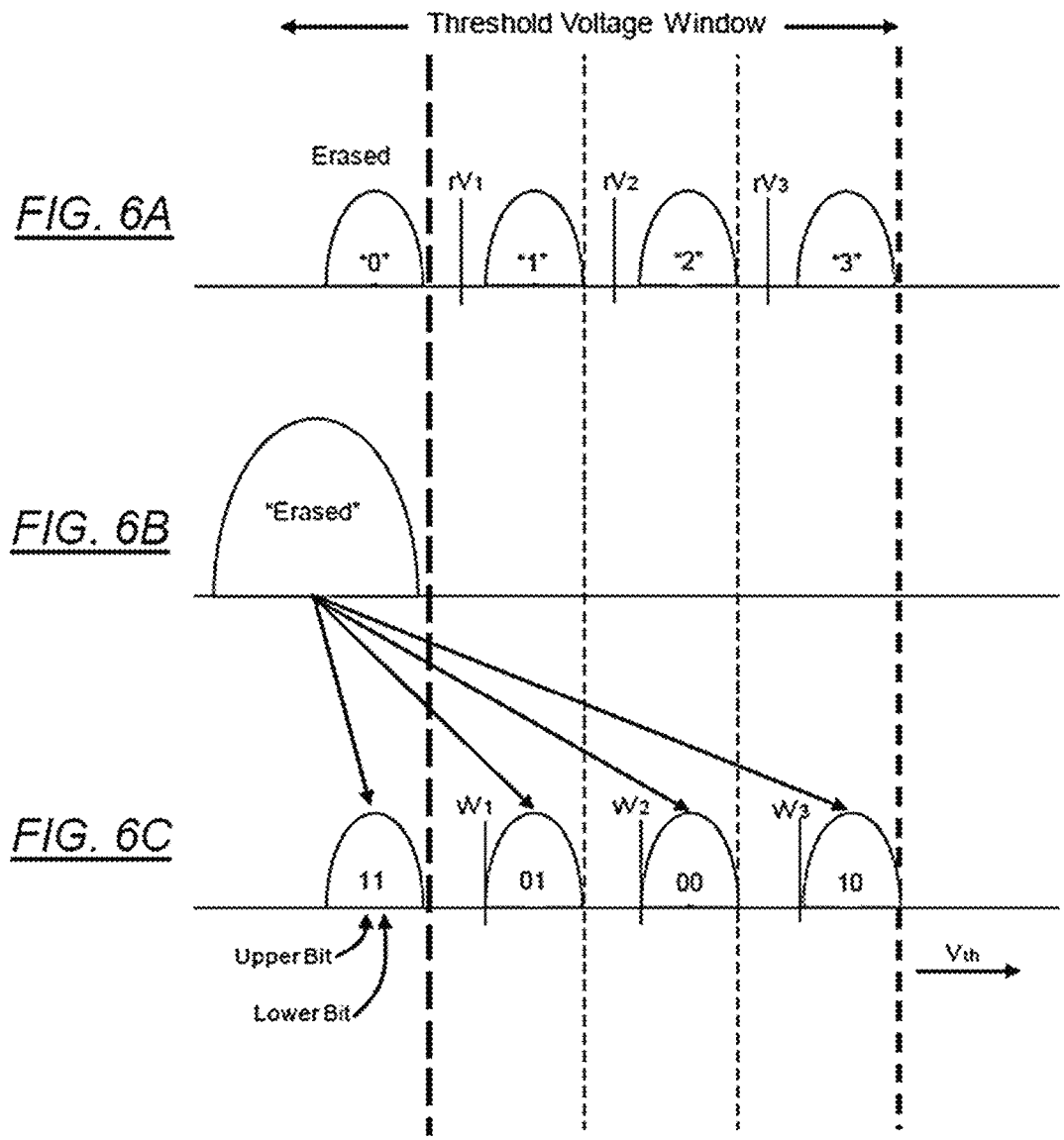
FIGS. 6A-6C depict stages of programming four states of a population of MLC NAND-type memory cells, in accordance with exemplary embodiments.

To illustrate an exemplary embodiment of the programming stages of a MLC-type memory device comprising a population of four-state memory cells, reference is made to FIGS. 6A-6C. In FIG. 6A, there is depicted a population of memory cells in which the characteristic threshold voltage window is divided into four distinct voltage distributions wherein each distribution corresponds to a programmable memory state (i.e., memory states "0," "1," "2," and "3"). FIG. 6B illustrates an initial distribution of "erased" threshold voltages for an erased memory. In FIG. 6C, much of the memory cell population is programmed such that the initial "erased" threshold voltage of a given memory cell 10 is moved to a higher value into one of the three divided voltage zones demarcated by verify levels $vV_1$, $vV_2$, and $vV_3$. Accordingly, each memory cell can be programmed to one of the three programmable states "1," "2," and "3," or remain in the "erased" state. On a bit level, a 2-bit code having a lower bit and an upper bit can be used to represent each of the four memory states. For example, as depicted in FIG. 6C, the memory states "0," "1," "2," and "3" may be assigned bit values "11," "01," "00," and "10" respectively. In such an example, the 2-bit data may be read from the memory by sensing in a "full-sequence" mode where the two bits are sensed together by sensing relative to the corresponding read demarcation threshold voltages $rV_1$, $rV_2$, and $rV_3$ in three sub-passes respectively.

Figure 7:
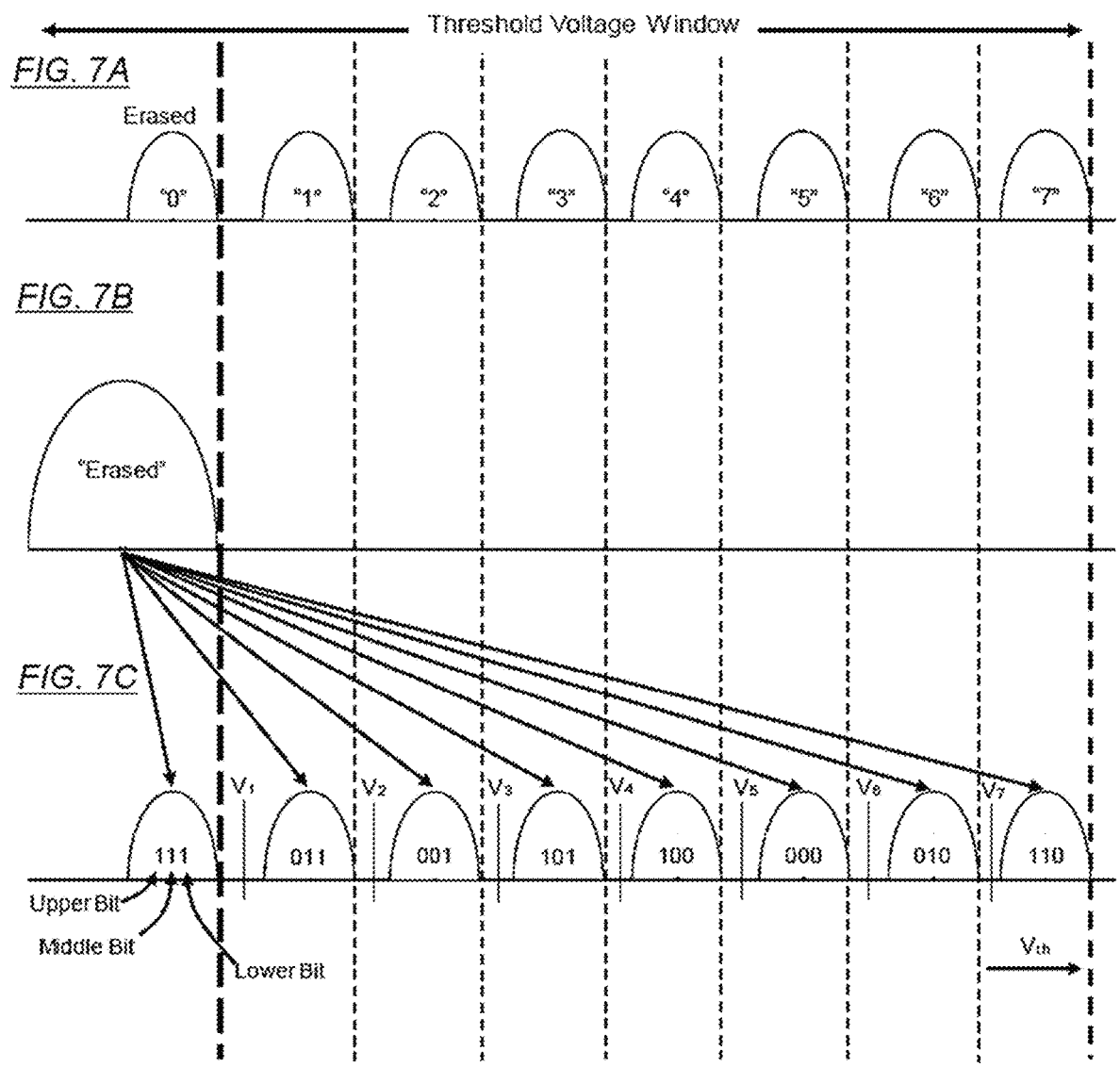
FIGS. 7A-7C depict stages of programming eight states of a population of TLC NAND-type memory cells, in accordance with exemplary embodiments.

Similarly, FIGS. 7A-7C illustrate programming stages of a TLC-type memory device comprising a population of eight-state memory cells, each cell being programmable into eight distinct distributions of threshold voltages that, in accordance with this particular embodiment, represent memory states "0," "1," "2," "3," "4," "5," "6," and "7," respectively (as shown in FIG. 7A). Thus, FIG. 7B depicts an initial distribution of "erased" threshold voltages for an erased memory. Further, FIG. 7C depicts an example of the memory after many of the memory cells have been programmed. As a result, a cell's threshold voltage is moved higher into one of the distinct voltage ranges demarcated by levels $V_1$, $V_2$, $V_3$, $V_4$, $V_5$, $V_6$, and $V_7$. Accordingly, each memory cell can be programmed to one of the seven programmed states "1" through "7," or can remain unprogrammed in the "erased" state. As a consequence of the programming, the initial distribution of the "erased" state as shown in FIG. 7B becomes narrower as indicated by the "0" state in FIG. 7C. In this case, a 3-bit code having lower, middle, and upper bits can be used to represent each of the memory states (i.e., "111," "011," "001," "101," "100," "000," "010," and "110") and the 3-bit data may also be read from the memory by sensing in the "full-sequence" mode where the three bits are sensed together by sensing relative to the demarcation threshold values $V_1$ through $V_7$ in seven sub-passes respectively.

Figure 8:
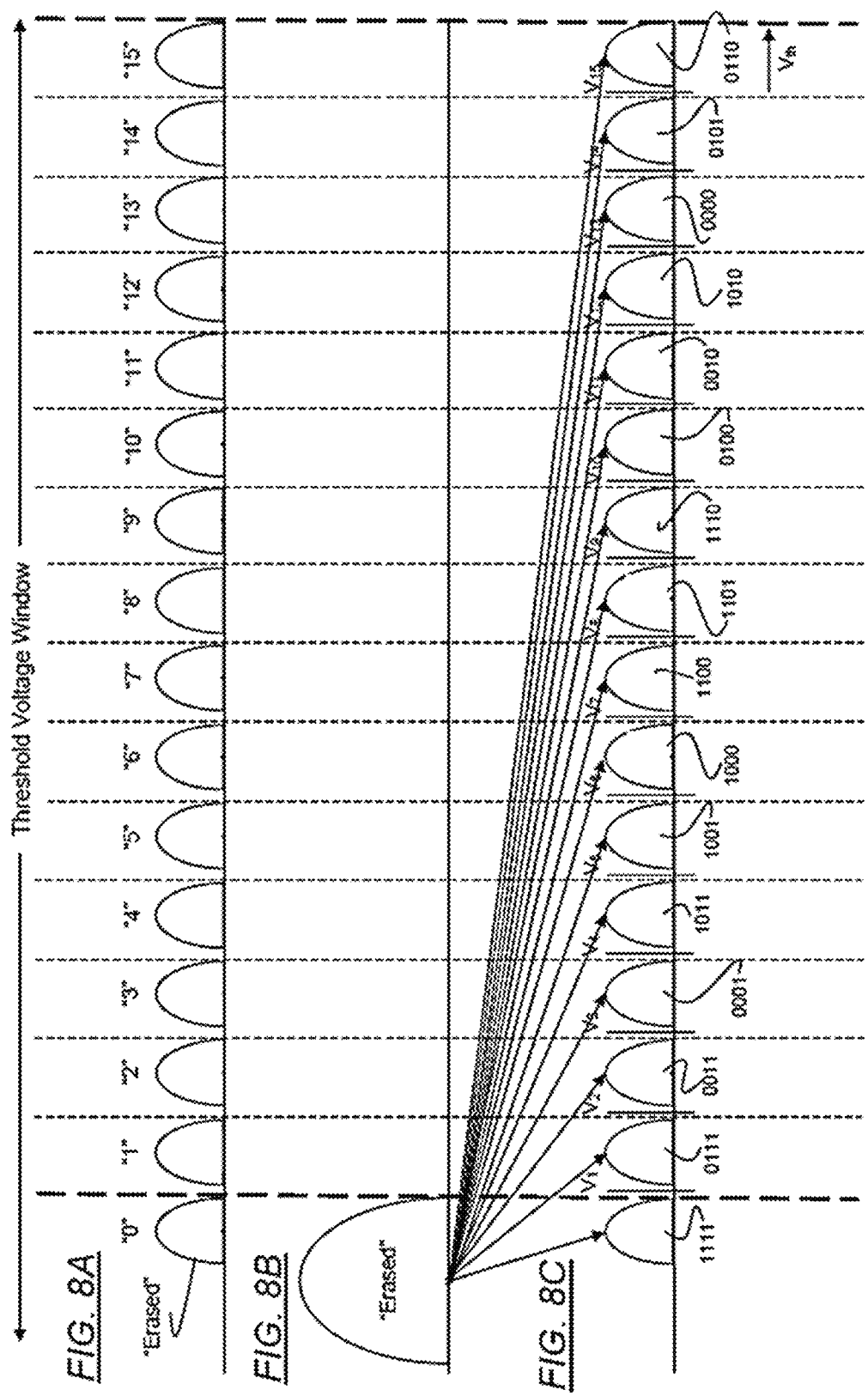
FIGS. 8A-8C depict stages of programming 16 states of a population of QLC NAND-type memory cells, in accordance with exemplary embodiments.

Continuing in a similar manner, FIGS. 8A-8C illustrate the programming stages of a QLC-type memory device comprising a population of 16-state memory cells, each cell being programmable into 16 distinct distributions of threshold voltages that, in accordance with this particular embodiment, represent memory states "0," "1," "2," "3," "4," "5," "6," "7," "8," "9," "10," "11," "12," "13," "14," and "15," respectively (as shown in FIG. 8A). Accordingly, FIG. 8B depicts an initial distribution of "erased" threshold voltages for an erased memory; whereas FIG. 8C depicts an example of the memory after programming. As depicted, a cell's threshold voltage is moved higher into one of the distinct voltage ranges, as demarcated by levels $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, and $V_{15}$. Therefore, each memory cell can be programmed to one of 15 programmed states "1" through "15," or can remain unprogrammed in the "erased" state. Again, as a consequence of the programming, the initial distribution of the "erased" state as shown in FIG. 8B becomes narrower as indicated by the "0" state in FIG. 8C. Thus, according to this particular distribution, a 4-bit code having lower, middle, upper and top bits can be used to represent each of the memory states (i.e., "1111," "1110," "1100," "1101," "0101," "0100," "0000," "0010," "0110," "0111," "0011," "0001," "1001," "1011," "1010," and "1000").

Figure 9:
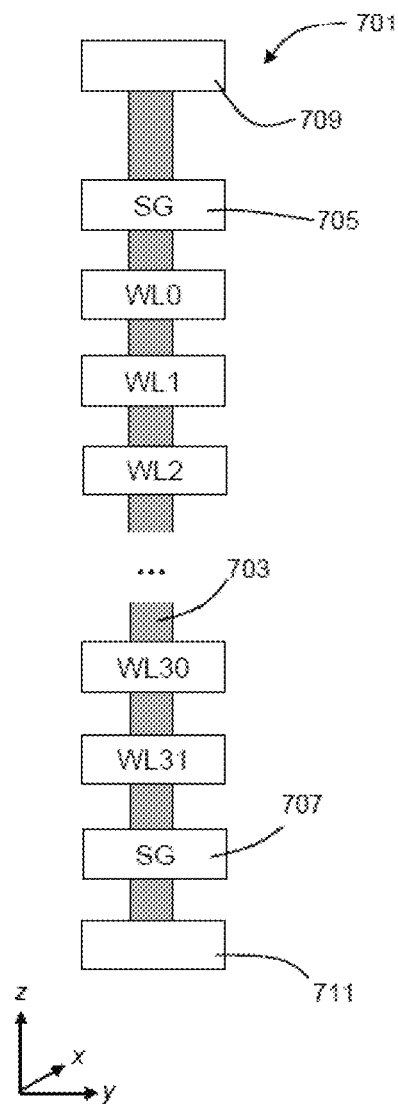
FIG. 9 depicts a vertical NAND-type string in accordance with an exemplary embodiment.

In FIGS. 4A-4B and 5 and the foregoing corresponding discussion, there is generally described a two-dimensional (or planar) memory array 210 (lying in a x-y plane, for example), which may comprise NAND-type memory cells. However, in an alternative configuration, a memory array may be in the form of a three-dimensional array that, unlike being formed on a planar surface of a semiconductor wafer, the array extends upwards from the wafer surface and comprises stacks or columns of memory cells extending vertically in an upwards direction (for example, in a z direction that is perpendicular to the x-y plane). For example, in FIG. 9 there is depicted an exemplary embodiment of a NAND-type string 701, which is operated in a similar manner as a planar two-dimensional NAND-type string (such as the NAND-type string 50 described above). In this configuration, a memory cell is formed at the juncture of a vertical bit line (see e.g., local bit line 703) and a word line (see e.g., word lines WL0, WL1, etc.), wherein a charge trapping layer located between the local bit line 703 and an intersecting word line stores charge (which dictates the threshold voltage of the transistor formed by the word line—gate—coupled to the vertical bit line—channel—that it encircles). To form such a vertical string 701, stacks of word lines are formed and memory holes are etched at the appropriate locations where cells are to be formed, wherein each memory hole is lined with a charge trapping layer and filled with a suitable local bit line/channel material. Dielectric layers are included for the necessary isolation. Further, located at either end of the NAND-type string 701 are select gates 705, 707, which allow for the selective connection to, or isolation from, external elements 709, 711 that include, for example, conductive lines such as common source lines or bit lines that serve large numbers of strings 701 of an array. In the particular embodiment shown in FIG. 9, the vertical NAND-type string 701 has 32 memory cells (i.e., at the juncture between local bit line 703 and word lines 0 through 31) connected in series. However, a NAND-type string 701 may comprise any suitable number of memory cells.

As described above, memory cells of the memory structure 200 may be arranged in a single memory device level in an ordered two-dimensional array of a plurality of rows and/or columns. Alternatively, a three-dimensional memory array may be arranged such that memory cells occupy multiple planes or multiple memory device levels, thereby forming a structure that has three dimensions (e.g., in the x, y, and z directions, wherein the z direction is substantially perpendicular and the x and y directions are substantially parallel to the major surface of the semiconductor substrate). In some exemplary embodiments, a three-dimensional memory structure 200 may be vertically arranged as a stack of multiple two-dimensional memory array device levels. In other exemplary embodiments, the three-dimensional memory structure 200 is arranged as multiple vertical columns (wherein each column extends substantially perpendicular to the major surface of the substrate, i.e., in the z direction) with each column having multiple memory cells. In this example, the vertical columns may be arranged in a two-dimensional configuration (i.e., in the x-y plane), thereby forming a three-dimensional arrangement in which the memory cells are on multiple vertically stacked memory planes. Other configurations of memory elements in three dimensions can also constitute a three-dimensional memory array. However, generally speaking, a three-dimensional NAND array may be constructed by tilting a two-dimensional memory structure, such as structures 50 and 210 of FIGS. 4A-B and 5, respectively, in the vertical direction that is perpendicular to the x-y plane (i.e., the z direction), such that each y-z plane of the three-dimensional structure corresponds to the page structure of FIG. 5, wherein each plane is at differing locations along the x axis. As a result, the global bit lines (e.g., BL0, . . . , BLm, of FIG. 5) each run across the top of the memory structure to an associated sense amplifier (e.g., SA0, . . . , SAm). Accordingly, the word lines (e.g., WL0, . . . , WLn, of FIG. 5), and the source and select lines (e.g., SSL0, . . . , SSLn, and DSL0, . . . , DSLn, respectively) extend in the x direction, with the bottom of each NAND string (e.g., string 50) connected to a common source line.

Figure 10:
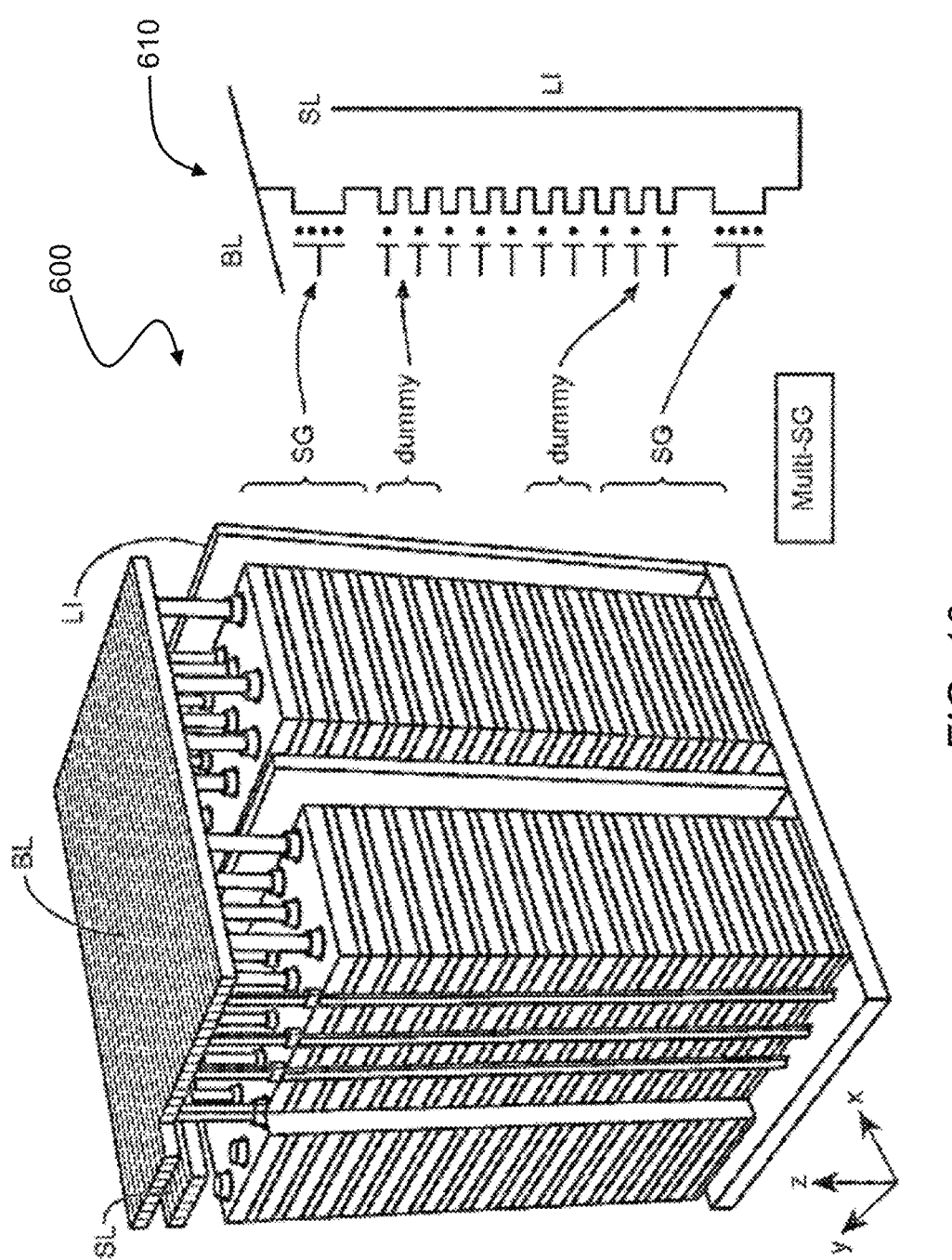
FIG. 10 is a perspective view of a representative subsection of a monolithic three-dimensional NAND-type memory array, in accordance with exemplary embodiments.

Referring now to FIG. 10, there is depicted an oblique perspective view of an example subsection of an embodiment of a three-dimensional NAND memory array 600 of the Bit Cost Scalable ("BiCS") type in which one or more memory device levels is formed above a single substrate. The example subsection corresponds to two of the page structures shown in FIG. 4B wherein, depending upon the particular embodiment, each may correspond to a separate memory block or may be different extensions of the same block. According to this embodiment, rather than lying in the same y-z plane, the NAND strings are pressed in the y-direction such that the NAND strings have a staggered configuration in the x-direction. Further, at the top of the array 600, the NAND strings are connected along global bit lines (BL) that span multiple of these subsections of the array 600 that run in the x-direction. In addition, global common source lines (SL) also run across multiple subsections of the memory array 600 in the x-direction and are connected to the sources at the bottom of the NAND strings by a local interconnect (LI) that operates as the local common source line of the individual extension. However, dependent upon the embodiment, the global source lines (SL) can span the whole, or just a subsection, of the memory array 600. Depicted on the right side of FIG. 10 is a schematic representation of the fundamental elements of one of the vertical NAND strings 610 of the memory array 600. Similar to the NAND string 50 of FIG. 4A, the string 610 is comprised of a series of interconnected memory cells. The string 610 is connected to an associated bit line (BL) through a drain select gate (SGD). A source select gate (SDS) connects the string 610 to a global source line (SL) through an associated local source line (LI). Further included in this particular embodiment are several dummy cells located at the ends of the string 610. Due to their proximity to select gates (SGD, SDS) and, thereby, their susceptibility to disturbs, the dummy cells are not used to store user data.

Figure 11:
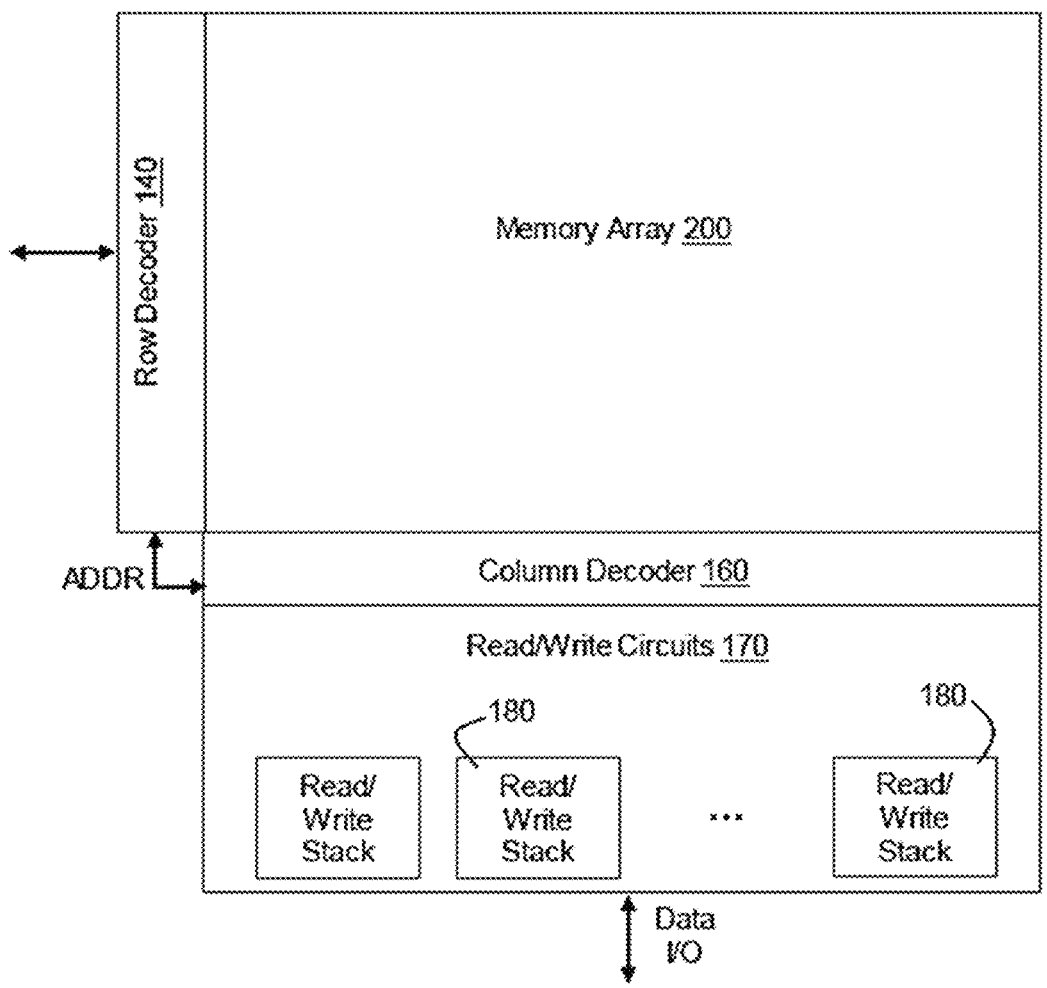
FIG. 11 schematically depicts a configuration of a non-volatile memory array that is accessible by read/write circuits via row and column decoders, in accordance with exemplary embodiments.
Figure 12:
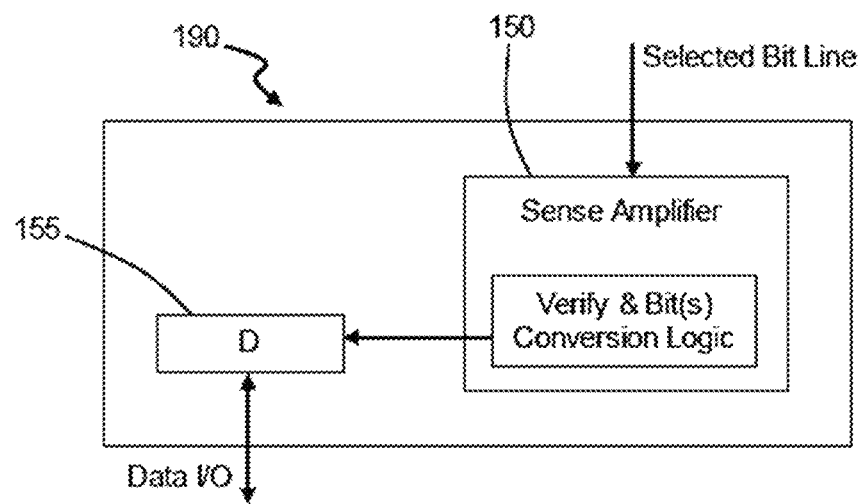
FIG. 12 is a block diagram of an individual read/write module, in accordance with an exemplary embodiment.

Referring back to the overall architecture of a memory system that is, for example, depicted in FIG. 1, a schematic depiction of a typical arrangement of a memory array of such a system is illustrated in FIG. 11. In this exemplary embodiment, there is shown a non-volatile memory array 200 that is accessible by read/write circuits 170 by way of row decoder 140 and column decoder 160. As previously described above, individual memory cells of the memory array 200 are addressable via a set of selected word line(s) and bit line(s). Accordingly, the row decoder 140 selects one or more word lines and the column decoder 160 selects one or more bit lines in order to apply the appropriate voltages to the respective gates of the addressed memory cells. Further, read/write circuits 170 are provided to read or write the memory states of the addressed memory cells, wherein the read/write circuits 170 comprise a number of read/write modules connectable via bit lines to the memory elements of the array 200. A schematic block diagram of such a read/write module 190 is provided in FIG. 12, according to an exemplary embodiment thereof. In operation, during a read or verify step, a sense amplifier 150 determines the current that is flowing through the drain of an addressed memory cell that is connected via a selected bit line. The level detected by the sense amplifier 150 is converted by a level-to-bits conversion logic to a set of data bits to be stored in a data latch 155. Now referring back to FIG. 11, the read/write circuits 170 are organized into banks of read/write stacks 180 wherein each read/write stack 180 is a stack of read/write modules 190.

Figure 13A:
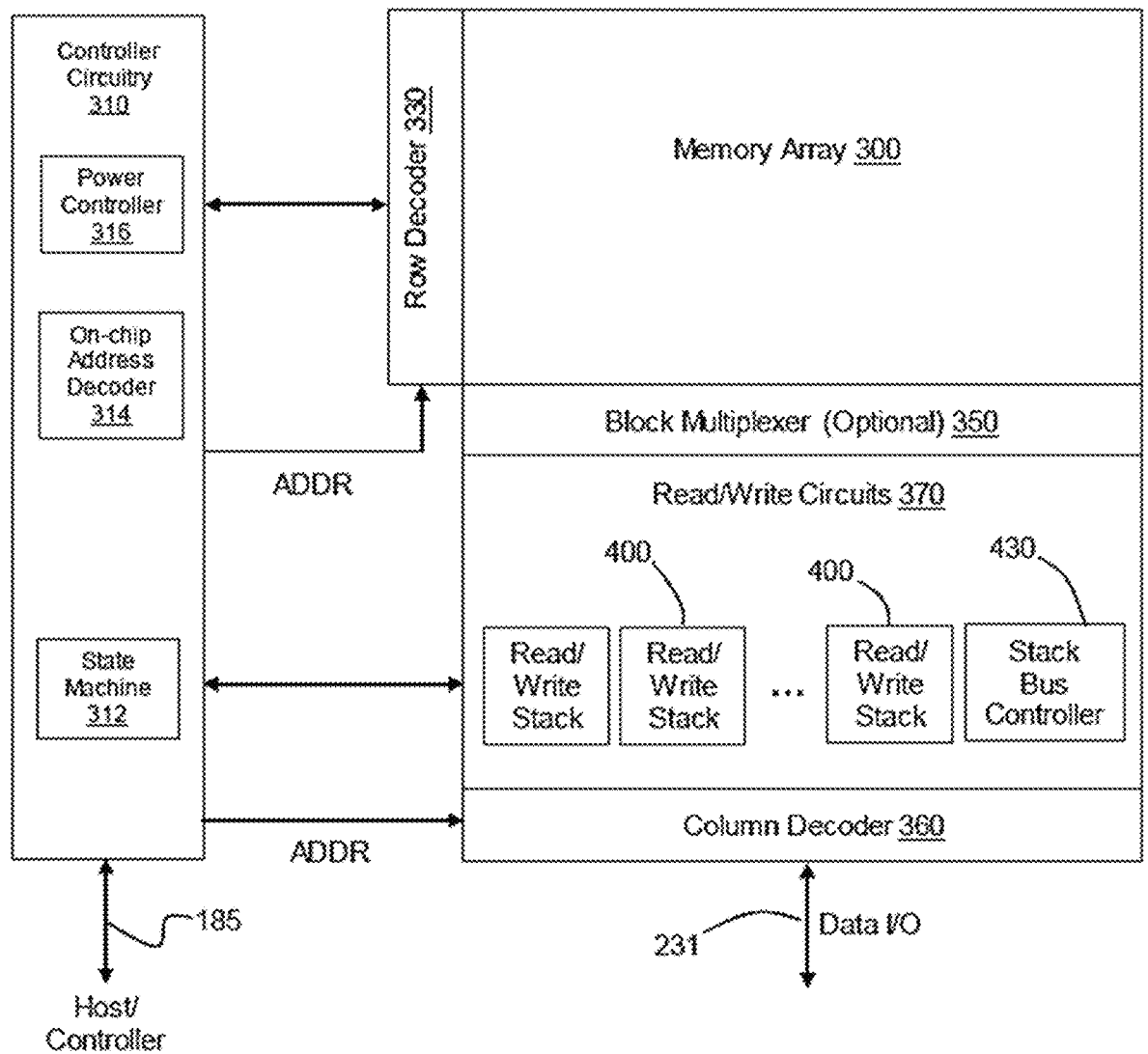
FIG. 13A schematically depicts a memory device with a bank of partitioned read/write stacks, in accordance with exemplary embodiments.

Referring now to FIG. 13A, there is shown an exemplary embodiment of a memory device (such as memory device 102 in FIG. 1, for example) that is comprised of a non-volatile memory array 300 (which may include the NAND-type SLC, MLC, TLC, and/or QLC memory cells that are in a two- or three-dimensional configuration), control circuitry 310, and read/write circuits 370. Further, as is depicted, read/write circuits 370 are comprised of one or more banks of partitioned read/write stacks 400, thereby allowing a block (or "page") of memory cells to be read or programmed in parallel wherein, according to an exemplary embodiment, a "page" of memory cells constitutes a contiguous row of memory cells. Memory array 300 is addressable by word lines via row decoder 330 and by bit lines via column decoder 360. Alternatively, the memory array 300 may comprise rows of memory cells partitioned into multiple blocks or pages. Hence, in such an exemplary embodiment, a block multiplexer 350 is provided to multiplex the read/write circuits 370 to the individual blocks.

With respect to the control circuitry 310, it operates in conjunction with the read/write circuits 370 to perform memory operations on the memory array 300. In this particular embodiment, the control circuitry 310 includes a state machine 312, an on-chip address decoder 314, and a power controller 316. The state machine 312 provides chip level control of memory operations. The on-chip decoder 314 provides an address interface between that that is used by the host or a memory controller to the hardware address used by the decoders 330, 360. Lastly, the power controller 316 controls the power and voltages that are supplied to the word lines and bit lines during memory operations.

Figure 13B:
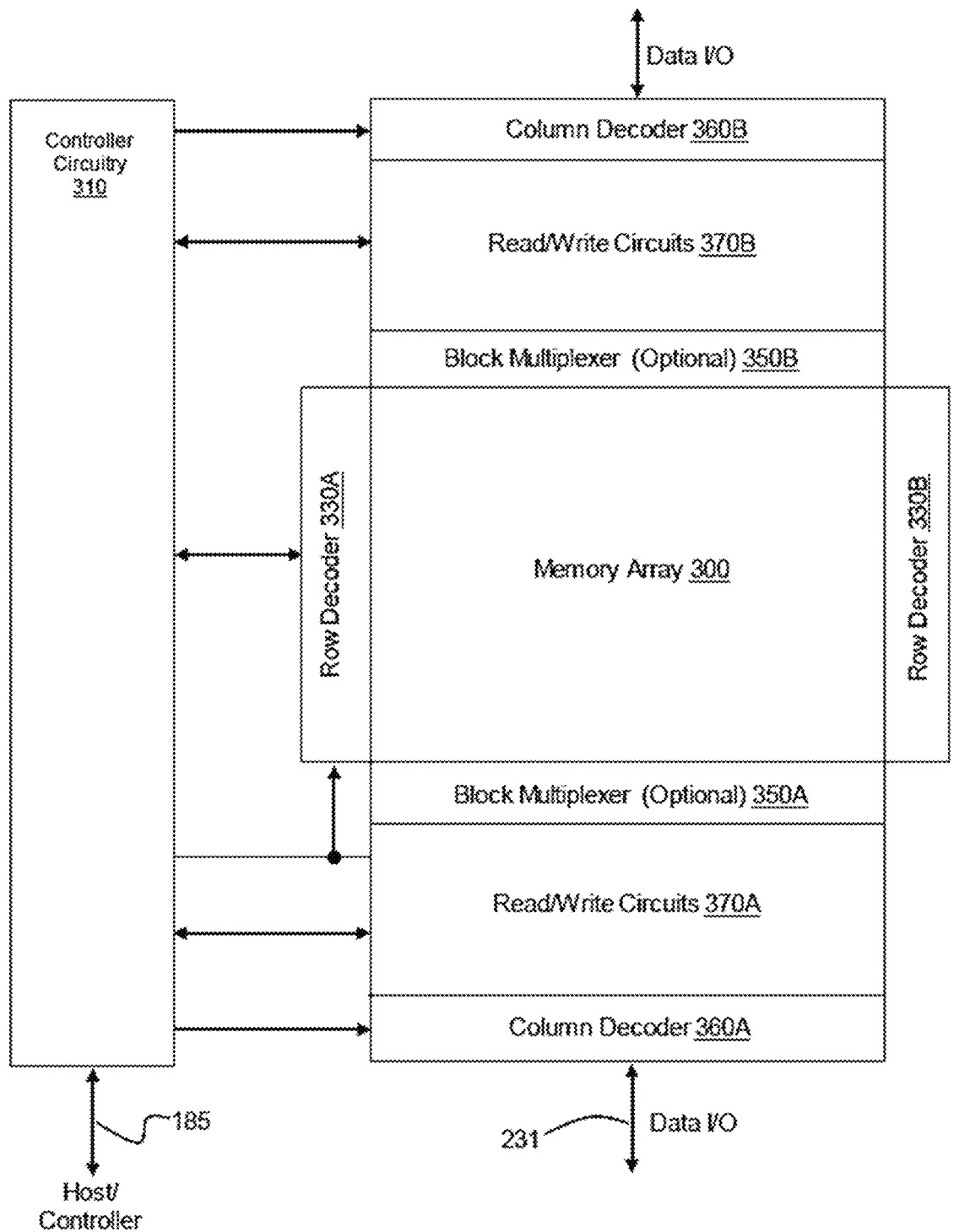
FIG. 13B schematically depicts the memory device of FIG. 13A in a slightly different configuration, in accordance with exemplary embodiments.

FIG. 13B depicts a slightly different exemplary embodiment of the memory device of FIG. 13A. In this particular embodiment, access to memory array 300 by the various peripheral circuits is implemented in a symmetrical manner on opposite sides of the memory array 300. As a result, the access lines and circuitry on each side of the memory array 300 are reduced in half when compared to the configuration in FIG. 13A. Specifically, the row decoder 330 is split into multiple row decoders 330A, 330B, and the column decoder 360 is split into multiple column decoders 360A, 360B. Furthermore, in such an embodiment in which a row of memory cells is partitioned into multiple blocks, block multiplexer 350 is split into multiple block multiplexers 350A, 350B. The read/write circuits 370 are likewise divided into read/write circuits 370A (connecting to bit lines from the bottom of memory array 300) and read/write circuits 370B (connecting to bit lines from the top of memory array 300). Accordingly, the density of the read/write modules (as well as the partitioned read/write stacks 400) is, in essence, reduced by half.

Figure 14:
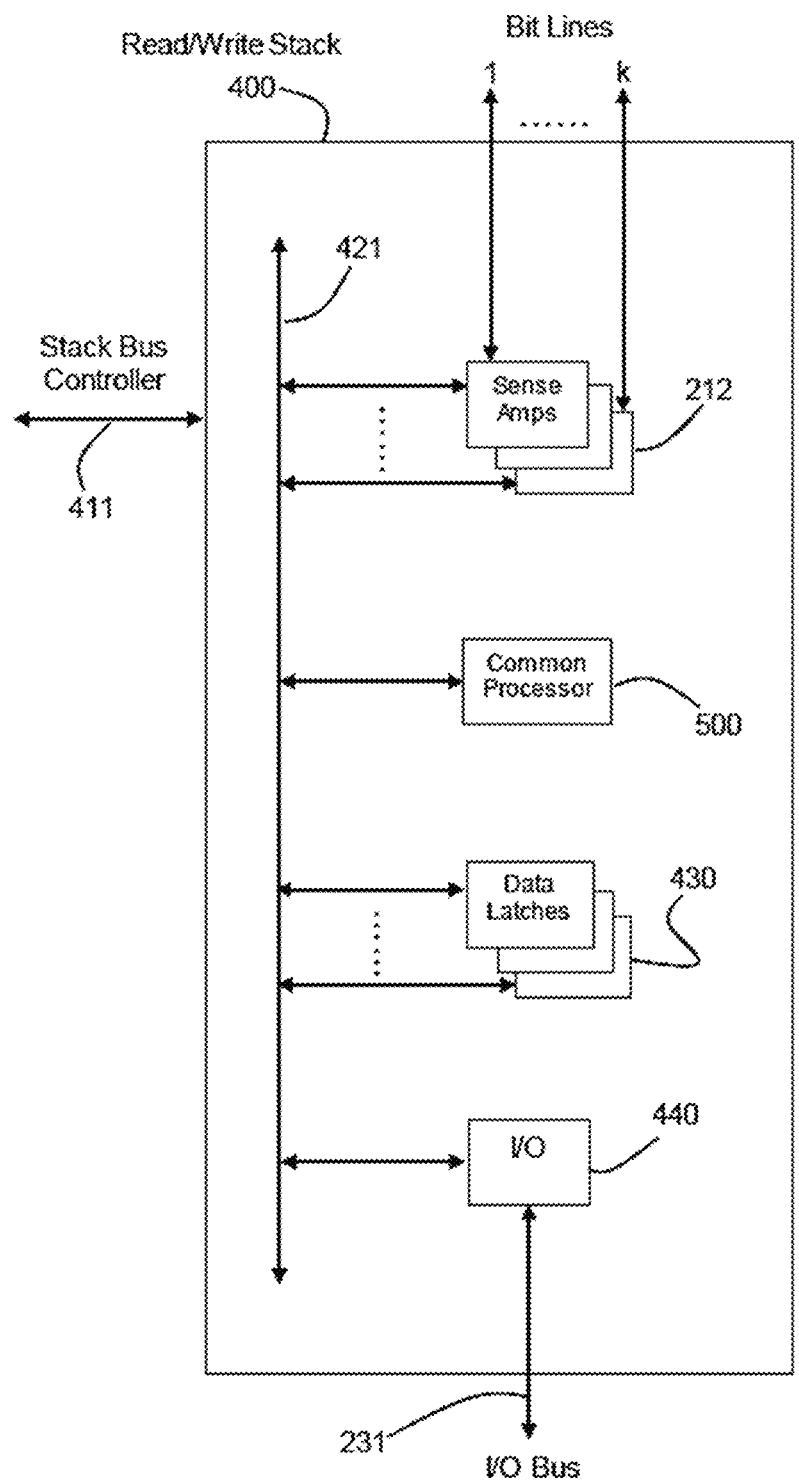
FIG. 14 schematically depicts various components of a read/write stack, such as the read/write stacks depicted in FIG. 13A, in accordance with exemplary embodiments.
Figure 15A:
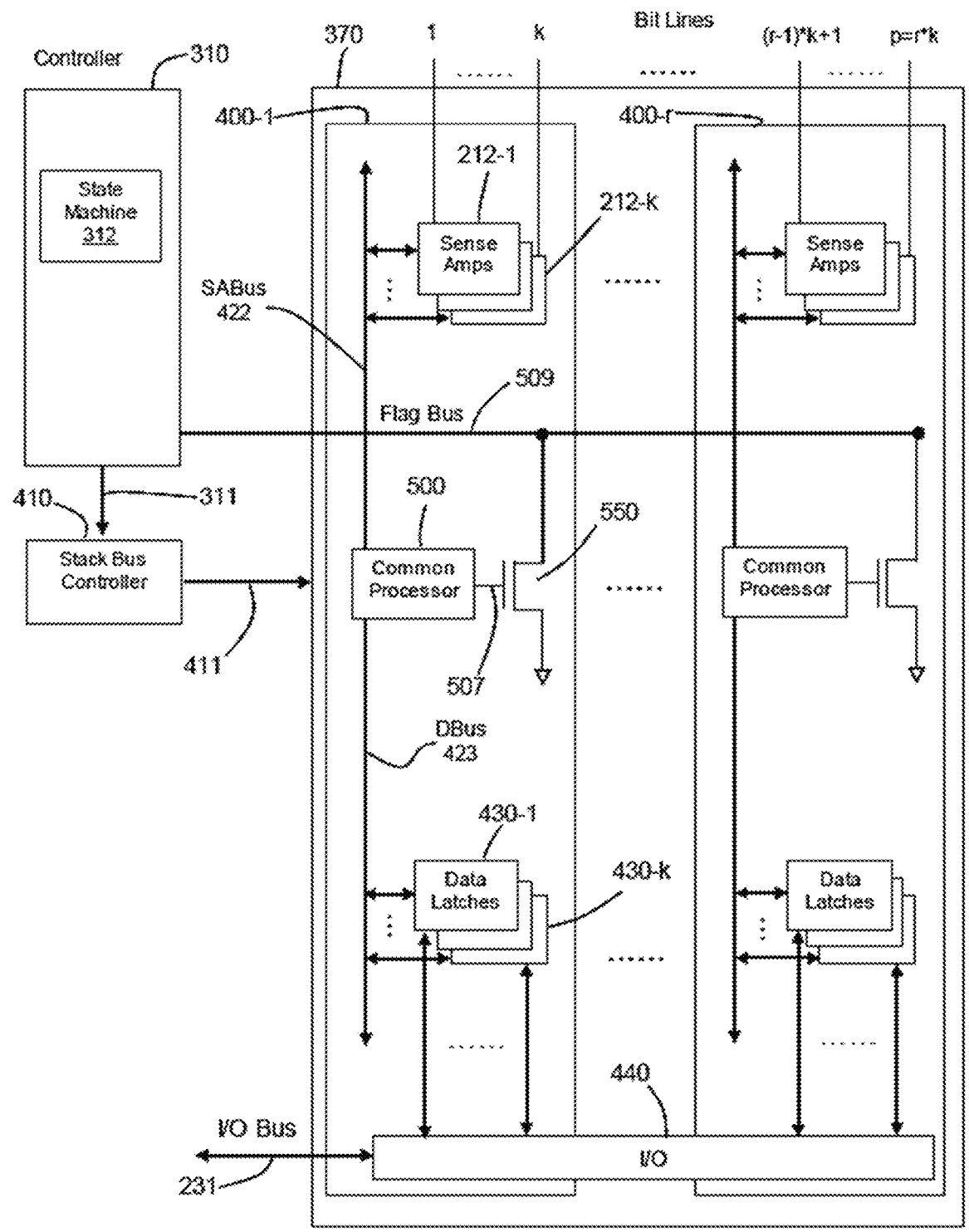
FIG. 15A schematically depicts a plurality of read/write stacks arranged amongst read/write circuits of a memory device, such as the memory device depicted in FIG. 13A, in accordance with exemplary embodiments.

Referring now to FIG. 14, there is illustrated an exemplary embodiment of certain components in a read/write stack, such as the read/write stacks 400 of FIG. 13A. According to this particular architecture, a read/write stack 400 comprises a stack of sense amplifiers 212 for sensing a "k" number of bit lines, an I/O module 440 for input or output of data over an I/O bus 231, a stack of data latches 430 for storing input and/or output data, a common processor 500 to process and store data among the read/write stack 400, and a stack bus 421 for communication among the read/write stack 400 components. In addition, a stack bus controller provides control and timing signals via lines 411 for controlling the various components of read/write stack 400. FIG. 15A depicts an exemplary embodiment for incorporating the read/write stack 400 of the embodiment of FIG. 14 amongst the read/write circuits 370 of the memory devices depicted in FIGS. 13A-13B. As indicated above, each of read/write stacks 400 operates on a group of "k"

number bit lines in parallel. Therefore, if a page in memory array 300 has p=r*k bit lines, there will be a "r" number of read/write stacks—i.e., read/write stacks 400-1, . . . , 400-r. Accordingly, the entire bank of partitioned read/write stacks 400-1, . . . , 400-r, operating in parallel allows a block (or a page) of p cells along a row to be read or programmed in parallel, there being p read/write modules for the entire row of cells. As each read/write stack 400-1, . . . , 400-r serves "k" memory cells, the total number of read/write stacks in a bank may be expressed as r=p/k. Further, in accordance with this example, each read/write stack correspondingly has a stack of sense amplifiers 212-1, . . . , 212-k that serves a segment of "k" memory cells in parallel. In addition, each read/write stack correspondingly has a stack of data latches 430-1, . . . , 430-k, wherein each data latch is associated with a memory cell. As such, there is an I/O module 440 enabling data latches 430-1, . . . , 430-k to exchange data externally via an I/O bus 231.

Still referring to FIG. 15A, there is also shown a stack bus controller 410 that receives signals from the memory controller 310 (via lines 311) and in turn provides control and timing signals to the read/write circuits 370 via lines 411. Communication among the read/write stacks 400 is implemented by an interconnecting stack bus controlled by stack bus controller 410. Therefore, the control lines 411 provide control and clock signals from the stack bus controller 410 to the components of the read/write stacks 400-1, . . . , 400-r. In this particular example, the interconnecting stack bus is divided into a SABus 422 and a DBus 423, wherein SABus 422 provides for communication between the common processor 500 and the stack sense amplifiers 212-1, . . . , 212-k, and the DBus 423 provides a communication pathway between the common processor 500 and the stack of data latches 430-1, . . . , 430-k. With respect to the common processor 500, it further comprises an output 507 for output of a status signal of a memory operation, such as an error condition. As is depicted in FIG. 15A, this status signal may, for example, be used to drive a gate of a n-transistor 550 that is tied to a Flag Bus 509 in a Wired-Or configuration, wherein the Flag Bus 509 is pre-charged by the controller 310 and is pulled down when a status signal is asserted by any of read/write stacks 400-1, . . . , 400-r.

Figure 15B:
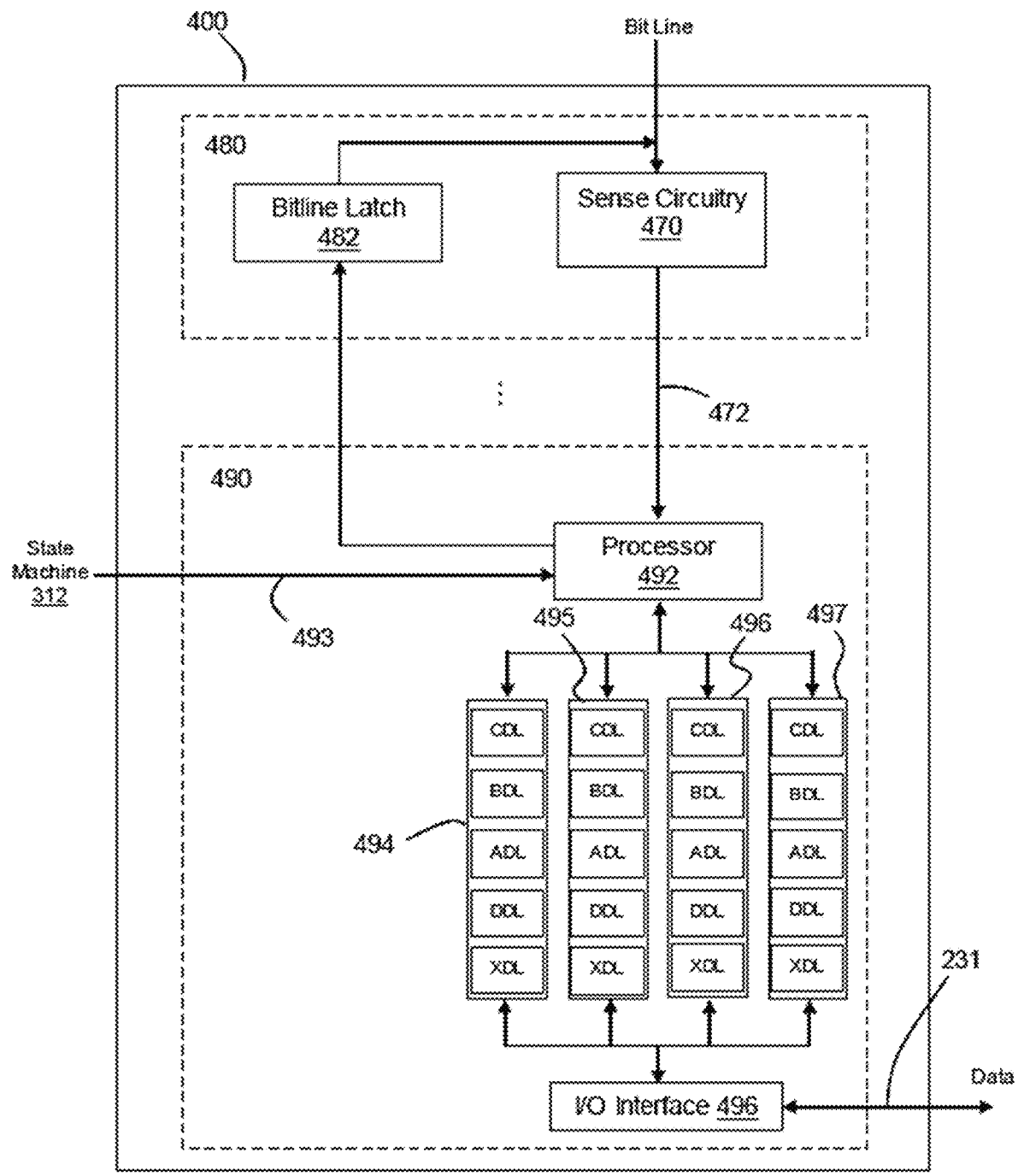
FIG. 15B is a block diagram depicting a sense block of a read/write stack, such as the read/write stacks depicted in FIG. 13A, in accordance with exemplary embodiments.

Further, an exemplary embodiment of an individual sense block (as encompassed by a read/write stack 400) is depicted in FIG. 15B. Sense block 400 is partitioned into one or more core portions comprising the sense modules 480 or sense amplifiers, and a common portion, referred to as a managing circuit 490. In one embodiment, there is a separate sense module 480 for each bit line and one common managing circuit 490 for a set of multiple, e.g., four or eight, sense modules 480. Each of the sense modules in a group communicates with the associated managing circuit via data bus 472. Thus, there are one or more managing circuits which communicate with the sense modules of a set of storage elements 10.

Sense module 480 comprises sense circuitry 470 that performs sensing by determining whether a conduction current in a connected bit line is above or below a predetermined threshold level. Sense module 480 also includes a bit line latch 482 that is used to set a voltage condition on the connected bit line. For example, a predetermined state latched in bit line latch 482 will result in the connected bit line being pulled to a state designating program inhibit (e.g., 1.5-3 V). As an example, a flag=0 can inhibit programming, while flag=1 does not inhibit programming.

In the exemplary embodiment of FIG. 15B, the managing circuit 490 comprises a processor 492, four example sets of data latches 494, 495, 496, and 497, and an I/O interface 496 coupled between the sets of data latches 494-497 and the data bus 231. One set of data latches may be provided for each sense module 480, and data latches identified by XDL, DDL, ADL, BDL, and CDL may be provided for each set. In some cases, additional data latches may be used. In one exemplary approach, in a memory device which uses eight data states, XDL stores user data, DDL stores an indication of whether quick pass write programming is used, ADL stores a lower page of data, BDL stores a middle page of data, and CDL stores an upper page of data.

Processor 492 performs computations, such as to determine the data stored in the sensed storage element and store the determined data in the set of data latches. Each set of data latches 494-497 is used to store data bits that are determined by processor 492 during a read operation, and to store data bits imported from the data bus 231 during a programming operation which represent write data that is meant to be programmed into the memory. The I/O interface 496 provides an interface between data latches 494-497 and the data bus 231.

During reading, the operation of the system is under the control of state machine 312 that controls the supply of different control gate voltages to the addressed storage element 10. As it steps through the various predefined control gate voltages corresponding to the various memory states supported by the memory, the sense module 480 may trip at one of these voltages and a corresponding output will be provided from sense module 480 to processor 492 via bus 472. At that point, processor 492 determines the resultant memory state by consideration of the tripping event(s) of the sense module and the information about the applied control gate voltage from the state machine via input lines 493. It then computes a binary encoding for the memory state and stores the resultant data bits into data latches 494-497. In another embodiment of the managing circuit 490, the bit line latch 482 operates in a double duty capacity, both as a latch for latching the output of the sense module 480 and also as a bit line latch as described above.

During program or verify operations, the data to be programmed (write data) is stored in the set of data latches 494-497 from the data bus 231. The programming operation, under the control of the state machine 312, comprises a series of programming voltage pulses applied to the control gates of the addressed storage elements. Each program pulse is followed by a read back (verify) to determine if the storage element has been programmed to the desired memory state. In some cases, processor 492 monitors the read back memory state relative to the desired memory state. When the two are in agreement, the processor 492 proceeds to set the bit line latch 482 to cause the bit line to be pulled to a state designating program inhibit. This inhibits the storage element coupled to the bit line from further programming even if program pulses appear on its control gate. In other embodiments, the processor initially loads the bit line latch 482 and the sense circuitry sets it to an inhibit value during the verify process.

As mentioned, each set of data latches 494-497 may be implemented as a stack of data latches for each sense module. In one exemplary embodiment, there are three data latches per sense module 480. In some implementations, data latches are implemented according to a shift register so that the parallel data that is stored therein is converted to serial data for data bus 231, and vice versa. For example, all data latches corresponding to the read/write block of M storage elements can be linked together to form a block shift register so that a block of data can be input or output by serial transfer. In particular, the bank of read/write modules may be adapted in order that each of its set of data latches will shift data into or out of the data bus in sequence as if they are part of a shift register for the entire read/write block.

The data latches identify when an associated storage element 10 has reached certain mileposts in a programming operation. For example, latches may identify if a storage element's $V_{th}$ is below a particular verify level. Data latches indicate whether a storage element currently stores one or more bits from a page of data. For example, with respect to one exemplary embodiment, the ADL latch is flipped (e.g., from 0 to 1) when a lower page bit is stored in an associated storage element. Further, the BDL latch is flipped when a middle page bit is stored in an associated storage element. And the CDL latch is flipped when an upper page bit is stored in an associated storage element. A bit is stored in a storage element when the $V_{th}$ exceeds an associated verify level.

As mentioned above, these high storage density memory structures, such as the types described above, have relatively small spacing between the adjacent memory elements (e.g., memory cells or holes), and each element has a relatively small tolerance between the discrete voltage ranges for memory functions. Accordingly, improving the amount of efficient storage capability within a fixed die size has competing drawbacks and liabilities. As previously mentioned, some challenges arise from electrical phenomena occurring from electron charges being retained on, for example, a charge trapping layer of a three-dimensional NAND-type memory array structure. For example, interference as a result of the electrostatic coupling between, for example, neighboring word lines (WL), may occur. Furthermore, once a memory hole/cell is programmed, the retained electron charges may, over time, physically migrate or diffuse to one or more of the neighboring memory holes or cells based on, for example, an electrical gradient, leading to a lateral shift in the threshold voltage ($V_{th}$) distributions of the programmed charge state(s). Accordingly, any occurrences of electron interference and lateral shifting may significantly compromise the reliability of the programmed data.

Additionally, according to various observations with regard to these scalable memory structures, there are particular challenges in maintaining the stability and uniformity across an entire memory structure with respect to the semiconductor materials that are used to fabricate certain memory storage elements of the scalable memory. Such nonuniformities can lead to performance limitations and inconsistencies in, for example, the programming operations of a memory structure, due to the resulting variations in the electrical characteristics. For example, there appears to be a distinct correlation, or a location dependence, between variations existing amongst the relative thicknesses of the multiple oxide layers (e.g., AiO or SiO) that comprise a substructure (e.g., in a memory cell, string, or block) of a scalable memory device (as a consequence of the existing fabrication processes) and inconsistencies in, for example, the threshold voltage ($V_{th}$) distribution amongst the memory element(s) comprising the memory structure.

Figure 16A:
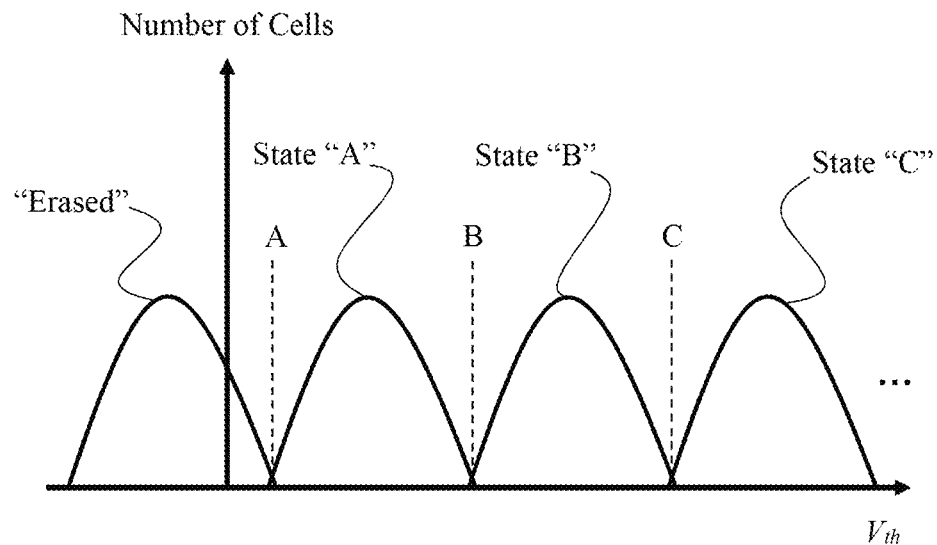
FIG. 16A generally depicts an "intended" threshold voltage ($V_{th}$) distribution with respect to certain program states of a given memory structure, in accordance with exemplary embodiments.
Figure 16B:
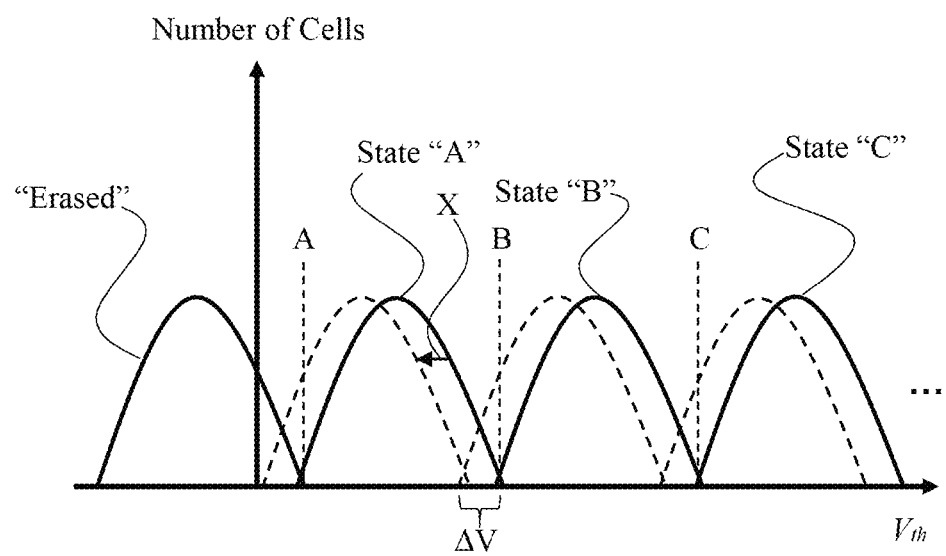
FIG. 16B generally depicts, subsequent to a voltage disturbance or shift, an "actual" threshold voltage ($V_{th}$) distribution of the program states that are depicted in FIG. 16A, in accordance with exemplary embodiments.

Therefore, due to these and perhaps other underlying causes or sources, the threshold voltage ($V_{th}$) distribution of each of the programmable state(s) of a memory structure may experience a problematic shift or become skewed over time. As a result, any subsequent read operations must take into account any disturbances to the intended threshold voltage ($V_{th}$) distribution(s) in order to accurately determine or reflect the programmed data. Otherwise, a significant degree of fail bit count (FBC) errors occur, thereby compromising the reliability and performance of the memory device. By way of background, the illustrations depicted in FIGS. 16A and 16B provide a general demonstration of the challenge in performing an accurate read operation after a distortion has occurred with respect to the intended threshold voltage ($V_{th}$) distributions of the programmed states of a memory structure. Thus, beginning with FIG. 16A, provided therein is a diagram generally indicating the respective threshold voltage ($V_{th}$) distributions of several programmed states of a memory structure (in accordance with one exemplary embodiment). For the sake of brevity, only three program states (in addition to the "erased" state) are shown. The three program states that are pictured therein are referenced as State "A," "State B," and State "C." Also depicted in this diagram are, with respect to each program state, a respective read verify voltage (rV) level that has been pre-determined in accordance with, for example, a fixed read verify voltage level approach or methodology. Each read verify voltage level is indicated in the diagram by a dotted line (i.e., dotted line "A" with respect to State "A," dotted line "B" with respect to State "B," and dotted line "C" with respect to State "C"). Accordingly, as depicted in the diagram, each respective read verify voltage level accurately indicates a lower tail region (or an approximate averaging thereof) of the threshold voltage ($V_{th}$) distribution curve of its associated program state according to expected (or the presumed) conditions. As such, a bit count scan, according to the operational circumstances depicted in FIG. 16A, should result in a correct and reliable read operation.

Referring now to FIG. 16B, depicted therein is a threshold voltage ($V_{th}$) distribution diagram that indicates the same threshold voltage ($V_{th}$) distribution curves for each of the three program states (i.e., State "A," State "B," and State "C") shown in the diagram in FIG. 16A. However, in contrast to the diagram in FIG. 16A, the three threshold voltage ($V_{th}$) distribution curves have now undergone, for example, a downward voltage level shift in the direction of the arrow "X." Thus, the "actual" threshold voltage ($V_{th}$) distributions (as indicated by the dotted curves) of the three program states no longer correspond to the predicted (or the intended) threshold voltage ($V_{th}$) distribution curves by a voltage difference of $\Delta V$. As a result of this disturbance and/or systematic shift in the threshold voltage ($V_{th}$) distribution curves of the programmed states, the same predetermined fixed read verify voltage levels (as indicated by dotted lines "A," "B," and "C"), when applied in a subsequent read operation, will no longer accurately reflect (or detect or indicate) the lower tail regions (or an approximate averaging thereof) of the "actual" (or true) threshold voltage ($V_{th}$) distribution curves of the associated programmed states. Therefore, in a bit scan count that does not take into account the voltage difference $\Delta V$, debilitating read errors and failures will likely result.

Various correction or mitigation mechanisms may be employed to address the problematic read inaccuracy with respect to threshold voltage ($V_{th}$) distribution curves (of programmed states) that experience shifting due to, for example, data retention loss over time and/or systematic variations that are present in the memory structure. For example, illustrated generally in FIGS. 17 and 18 is an exemplary embodiment of such a mitigation (or corrective) mechanism. This mechanism may be referred to herein as a "time tag" read operation. This mechanism may be applied to any non-volatile memory structure that has undergone such an unintended voltage shift. However, for purposes of explanation, FIGS. 17 and 18 depict the mechanism as applied to a specific memory block 800 that comprises a total of 112 word lines (WLs), i.e., $WL_0$ through $WL_{111}$. Further, in this particular example, the memory block 800 comprises a population of TLC NAND-type memory cells (not shown). As such, the memory cells of memory block 800 comprise seven (7) programmable states (not including an "erased" state). For purposes of the following description, the seven programmable states are referenced herein as State "A," State "B," State "C," State "D," State "E," State "F", and State "G."

Beginning with FIG. 17, at the lefthand side thereof, there is generally depicted the memory block 800 as it appears at a time, T1. Specifically, at time T1, memory block 800 has been fully programmed (i.e., programmed with respect to each of the word lines $WL_0$ through $WL_{111}$) during a single programming operation. Additionally, at the righthand side of FIG. 17, there is generally depicted the memory block 800 as it appears at a subsequent time, T2, after a period of time has transpired. As indicated, at time T2, some or all of the memory cells of the memory block 800 have experienced an unintended voltage shift in the threshold voltage ($V_{th}$) distribution curves with respect to the associated program states. Therefore, under these circumstances, an accurate read operation must take into consideration the voltage shift (and magnitude thereof) that has occurred within the memory block 800.

For example, by detecting, with respect to each word line of memory block 800, the magnitude of the respective voltage shift, that is present at time T2 (for each program state), a corresponding offset value (DAC, voltage, etc.) may then be incorporated into the read verify voltage (rV) level that is applied with respect to each program state during the read operation. However, a significant amount of time and processor/memory capability is required in order to ascertain the voltage shift with respect to each word line (and for each program state) of the memory block 800. The resulting complexity and increased read latency resulting is, in most applications, simply impracticable and untenable in view of the performance demands and requirements for memory devices of this type. Thus, it may be possible to apply a similar, yet scaled back, mechanism for modifying the read verify voltage levels to take into account the voltage shift that may be experienced by a memory structure over the passage of time. In the following description, with reference to FIGS. 18 and 19, an exemplary embodiment of such a mechanism is described.

With respect to FIG. 18, depicted therein is an exemplary embodiment of a "lookup" table (or chart) 900. As shown, the "lookup" table 900 provides respective offset values (e.g., DAC values) that are to be applied for each word line, and with respect to each program state, during a read operation of a subject memory structure. For purposes of explanation here, the "lookup" table 900 of FIG. 18 is shown as being applied specifically to the memory block 800 pictured in FIG. 17. Accordingly, the "lookup" table 900 addresses, with respect to word lines $WL_0$ through $WL_{111}$, each of program State "A" through State "G." It is noted however that, according to this particular embodiment, the 112 word lines of memory block 800 are not addressed on an individual basis (i.e., in a word line-by-word line fashion) in the "lookup" table 900. Rather, in order to conserve time and resources of the memory device, the 112 word lines are divided or grouped into separate (or distinct) word line "zones", in which all word lines belonging to a particular "zone" are addressed in an identical manner under the "lookup" table 900. Therefore, according to this particular embodiment, word line $WL_0$ through $WL_{111}$ are divided (or partitioned) into eight (8) "zones" (i.e., "Zone 0" through "Zone 8"). However, it should be noted that this example is intended as a single non-limiting example and the chosen number of word line "zones," as well as which precise word lines are designated to be in each "zone," is variable and may be in any format that is suitable for the efficient operation of the memory.

Additionally, the offset values that are set forth in the "lookup" table 900 are pre-calibrated offset values that are derived (or otherwise measured or determined), based upon the properties of the subject memory structure, according to data and observations that are gathered and made experimentally and in situ.

Figure 19:
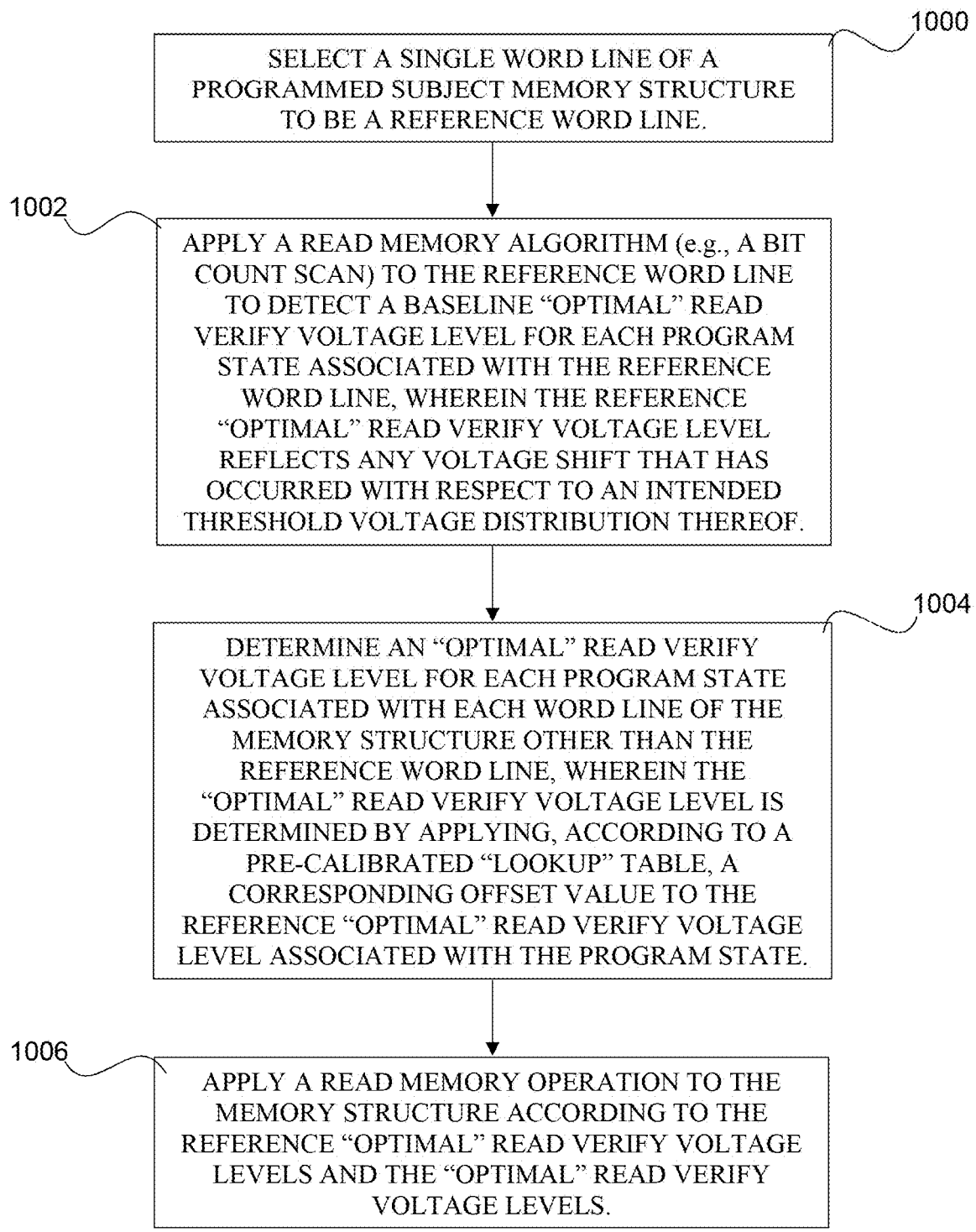
FIG. 19 is a flow diagram generally illustrating several steps of a "time tag" read operation that utilizes a pre-calibrated "lookup" table or chart, in accordance with exemplary embodiments.

With respect to FIG. 19, there is provided a flow diagram that generally outlines the several steps of a correction (or mitigation) mechanism that utilizes the offset values that are provided in a "lookup" table (such as "lookup" table 900) to determine the appropriate (and accurate) read verify voltage (rV) level for each program state of a memory structure that has undergone an unintended voltage shift ($\Delta V$) in the threshold voltage ($V_{th}$) distribution curve thereof.

In a first step 1000, a word line within the subject memory structure is selected as a reference word line ($WL_{REF}$). The reference word line ($WL_{REF}$) may be any word line existing within the memory structure. However, the precise word line chosen may be based on, for example, the location or position of the word line within the memory structure. By way of illustration, in the specific example of "lookup" table 900 (FIG. 18), a word line that is within "Zone 3" (e.g., $WL_{40}$) of the memory block 800 was chosen to be the reference word line (accordingly, $WL_{31} \le WL_{REF} \le WL_{54}$) (as indicated by the asterisk).

Next, at step 1002, once the subject memory structure has been programmed, a read memory algorithm is applied to the reference word line ($WL_{REF}$) in order to determine, for each program state, an "optimal" read verify voltage level. For example, a bit count scan may be applied, wherein the bit count scan effectively "sweeps" each "actual" threshold voltage ($V_{th}$) distribution curve to detect (or otherwise discern) the lower tail region (or an approximate averaging thereof) of the distribution curve. Accordingly, any voltage shift ($\Delta V$) that occurred (relative to the intended threshold voltage ($V_{th}$) distribution curve) is now captured within the determined "optimal" read verify voltage level. For reasons that are made apparent below, the "optimal" read verify voltage levels that are determined during this step with respect to the reference word line ($WL_{REF}$) are referred to herein as reference "optimal" read verify voltage levels.

According to the next step (1004), the reference "optimal" read verify voltage levels determined with respect to the reference word line ($WL_{REF}$) serve or operate as a baseline to which the offset values of the pre-calibrated "lookup" table (such as "lookup" table 900) are applied in order to determine a respective "optimal" read verify voltage level for each program state with respect to all word lines of the memory structure other than the reference word line ($WL_{REF}$). That is to say, each "optimal" read verify voltage level is derived (or determined) for each program state by applying, according to the pre-calibrated "lookup" table (e.g., "lookup" table 900), a corresponding offset value to the reference "optimal" read verify voltage level associated with that program state.

Accordingly, with respect to the specific example of the "lookup" table 900, logically, no offset value (i.e., "0") is applied with respect to the reference word line ($WL_{REF}$), as the reference word line ($WL_{REF}$) provides a baseline. Further, in accordance with this particular embodiment, the same conditions apply to all word lines (i.e., $WL_{31}$ through WL$_{54}$) within the same "zone" (i.e., "Zone 3") as the reference word line (WL$_{REF}$). However, with respect to all other word lines that are within the memory structure, a corresponding offset value for each program state can be easily determined according to the pre-calibrated "lookup" table 900 and applied to the reference "optimal" read verify voltage level in order to arrive at the appropriate "optimal" read verify voltage level with respect to that particular combination of word line and program state. Importantly, because the reference "optimal" read verify voltage levels are, as mentioned above, determined in light of any voltage shift ($\Delta V$) that has occurred with respect to each threshold voltage (V$_{th}$) distribution curve that is associated with the reference word line (WL$_{REF}$), the resulting "optimal" read verify voltage levels determined for the other word lines also reflect the voltage shift ($\Delta V$), as made possible by the offset values provided in the pre-calibrated "lookup" table. Therefore, any subsequent read operation that is applied according to the "optimal" read verify voltage levels formulated by this mechanism will effectively produce more accurate results.

Further, the pre-calibrated "lookup" table in conjunction with a scan of just a single reference word line allows for the highly efficient determination of the "optimal" read verify voltage levels with respect to every word line of the memory structure as there is no need to perform a word line-by-word line scan in order to determine the "optimal" read verify voltage levels with respect to each word line.

It should be noted that each offset value within the pre-calibrated "lookup" table comprises a pre-determined numerical value (which may constitute a plus or minus value or, in some cases, a zero value). However, for purposes of this description and in the interest of generality, each offset value indicated in the "lookup" table 900 is referenced therein with a beginning delta symbol ($\Delta$), then the applicable program state ("A" through "G"), and then the applicable word line "zone" ("0" through "8") to which that particular offset value pertains (or corresponds).

Referring still to FIG. 19, at a concluding step 1006, a read operation may be subsequently applied to the entire memory structure according to the reference "optimal" read verify voltage levels (i.e. with respect to the reference word line (WL$_{REF}$) and any word lines similarly treated according to the "lookup" table) and the derived "optimal" read verify voltage levels (i.e., with respect to all word lines).

Importantly, according to data and observations made experimentally and in situ, the offset values provided in the pre-calibrated "lookup" table (such as table 900) remain equally applicable to a memory structure over any passage or elapse of time due to the fact that, at any moment in time, the entire memory structure has undergone the same data retention loss. Furthermore, the same offset values still apply to the memory structure after each subsequent programming operation provided that the entire memory structure is programmed during the programming operation. However, as described in greater detail below, in the event that the memory structure is only partially programmed during a subsequent programming operation, application of the same initially determined offset values may no longer be accurate and will become problematic.

Figure 20:
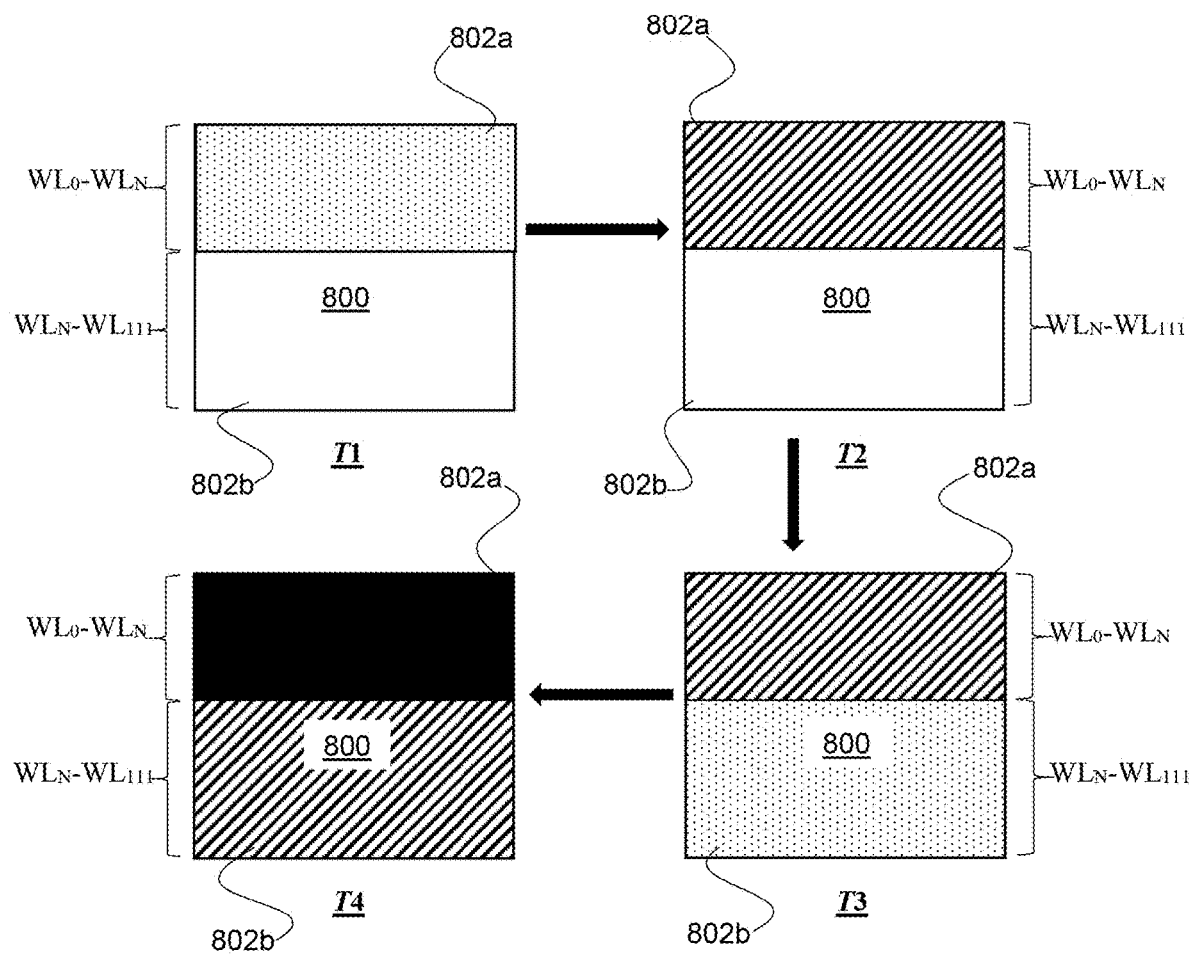
FIG. 20 depicts a fully programmed memory block that, due to being initially only partially programmed, has experienced a nonuniform unintended voltage shift ($\Delta V$) with respect to intended threshold voltage ($V_{th}$) distributions thereof, in accordance with exemplary embodiments.

Referring now to FIG. 20, there is depicted a series of four "snapshots" in time with respect to an example memory block that is initially only partially programmed and, at a subsequent time, becomes fully programmed. For purposes of explanation, the following description is applied to the specific memory block 800 that is depicted in FIG. 17 and is the subject of FIG. 18. Depicted in the upper left region of FIG. 20, at an initial time, T1, only a portion 802a (corresponding to the word lines WL$_0$ through WL$_N$, wherein "N" is any integer greater than 0 and less than 111) of memory block 800 has been programmed. As such, the remaining portion 802b (corresponding to the word lines WL$_N$ through WL$_{111}$) of the memory block 800 is unprogrammed (i.e., "erased"). Therefore, the memory block 800 may be characterized as an "open" memory block to indicate its condition of being only partially programmed.

Further, in the upper right region of FIG. 20, the memory block 800 is depicted as it appears at a subsequent time, T2. As indicated by the "hashed" lines, after the passage of time from time T1 to time T2, the programmed portion 802a of memory block 800 experienced a disruptive voltage shift ($\Delta V$) of the intended threshold voltage (V$_{th}$) distribution curve(s) with respect to the associated program state(s). As discussed above, various underlying causes contribute to such a voltage shift (e.g., the migration of electron charges over time due to, for example, an electrical gradient).

Continuing to the lower right region of FIG. 20, pictured is memory block 800 as it appears at a further subsequent time, T3. As indicated therein, at time T3, the remaining portion 802b of the memory block 800 has now been programmed. Accordingly, the memory block 800 may be characterized as a "closed" memory block to indicate its condition of being fully programmed.

Proceeding now to the lower left region of FIG. 20, depicted therein is memory block 800 as it appears at a later time, T4, after having been fully programmed. As indicated by the "hashed" lines, the later programmed portion 802b of the memory block 800 has, as the time transpired, undergone a problematic voltage shift ($\Delta V$) in its intended threshold voltage (V$_{th}$) distributions with respect to its program states. Also over this passage of time, an additional voltage shift ($\Delta V$) has also occurred with respect to the initially programmed portion 802a of memory block 800. (Accordingly, for illustrative purposes, in this view, portion 820a of the memory block 800 is depicted as solidly shaded.) As a result, there now exists, at time T4, a disparity between the two portions 802a and 802b of the memory block 800 with regard to the degree or the amount of the unintended voltage shift ($\Delta V$) that is now present. Thus, due to this disparity, the once pre-calibrated offset levels discussed above may no longer be applicable, particularly with respect to the initially programmed portion 802a of the memory block 800. Accordingly, it would be beneficial, in such a circumstance, to determine a mechanism for correspondingly updating (or modifying) the initial calibrated offset values (as set forth in a "lookup" table) to accurately reflect the uneven (i.e., additional) voltage shift ($\Delta V$) that has developed as a result of the nonuniform or piecemeal programming (over time) of the memory block as a whole.

Figure 21:
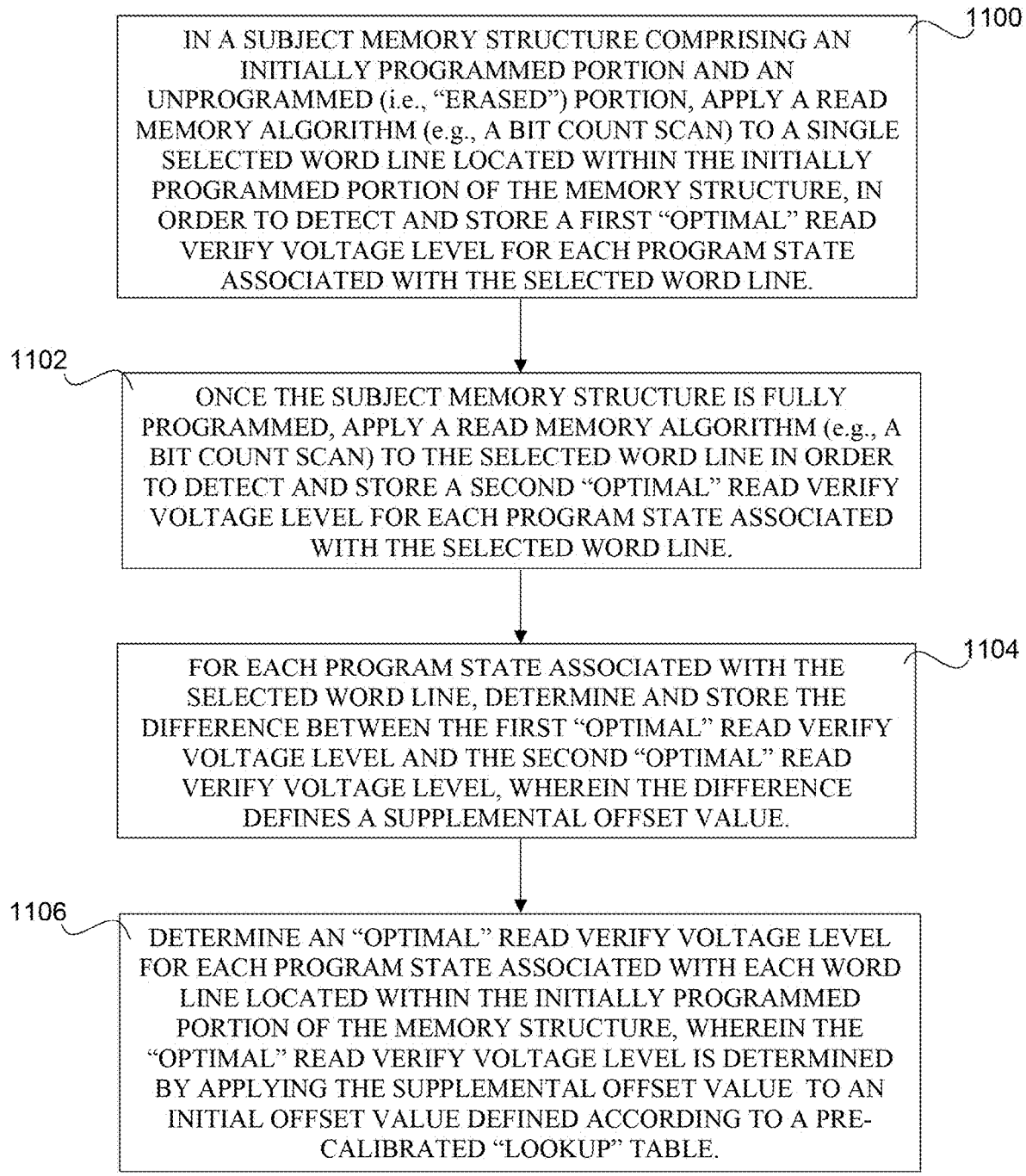
FIG. 21 is a flow diagram generally illustrating several steps for determining, with respect to the conditions depicted in FIG. 20, a supplemental "lookup" table or chart that is to be applied in a "time tag" read operation, in accordance with exemplary embodiments.

Reference is now made to the flow diagram provided in FIG. 21, which outlines, in general terms, several steps of a mechanism for updating or modifying the offset values of a "lookup" table to be used to in a "time tag" read operation (as described in detail above). Beginning with step 1100, in a non-volatile memory structure that comprises both an initially programmed portion and an unprogrammed ("erased") portion (e.g., memory block 800 as it appears at time T1 in FIG. 20), a read memory algorithm (e.g., a bit count scan) is applied to a single selected word line (referred to herein as WL$_k$) located within the initially programmed portion of the memory structure. To illustrate, when applying this initial step to the specific example of memory block 800 above, the selected word line (WL$_k$) must be selected from the initially programmed portion 802a (such that WL$_0 \leq$WL$_k \leq$WL$_N$) of memory block 800. As indicated at step 1100 (FIG. 21), a read memory algorithm is applied to the selected word line ($WL_k$) in order to detect a first "optimal" read verify voltage level with respect to the threshold voltage ($V_{th}$) distribution curve corresponding to each program state that is associated with the selected word line. Thereafter, the first "optimal" read verify voltage levels are stored in the memory device.

Next, at step 1102, once the subject memory structure is fully programmed, a read memory algorithm is again applied to the selected word line ($WL_k$) in order to detect a second "optimal" read verify voltage level with respect to each program state thereof. Accordingly, by virtue of this second read operation, any additional voltage shift ($\Delta V$) that may be present with respect to the intended threshold voltage ($V_{th}$) distributions once the memory structure is fully programmed is accurately reflected in the second "optimal" verify voltage levels determined at step 1102. Once determined, the second "optimal" read verify voltage levels are stored in the memory device.

Subsequently, at step 1104, with respect to each program state associated with the selected word line ($WL_k$), a difference between the first "optimal" read verify voltage level and the second "optimal" read verify voltage level is determined, wherein this difference defines a supplemental offset value. Thereafter, the supplemental offset value(s) are stored within the memory device.

Lastly, at step 1106, an "optimal" read verify voltage level is determined for each program state associated with each word line that is located within the initially programmed portion of the memory structure. Specifically, for each program state, the "optimal" read verify voltage level is determined by applying the corresponding supplemental offset value to, or in conjunction with, the corresponding initial offset value (that was defined in the initial pre-calibrated "lookup" table).

It should be noted that, with respect to the later programmed portion of the memory structure, a supplemental offset value does not need to be applied to the initial offset values provided in the initial pre-calibrated "lookup" table as the later programmed portion was not subject to the occurrence of an additional voltage shift ($\Delta V$).

Furthermore, it should be noted that a memory structure may not become fully programmed until after multiple programming operations occur, wherein the entire memory structure is only incrementally or gradually programmed over the course of several partial programming stages. However, once the memory structure is fully programmed, an additional series of supplement offset values must be determined with respect to the word line(s) that are associated with each partial programming operation.

For illustrative purposes, a supplemental "lookup" table 910 is provided in FIG. 22, wherein the supplemental "lookup" table 910 is a result of applying the mechanism of the exemplary embodiment outlined in FIG. 21 to the specific example of memory block 800 as it appears in FIG. 20 at time T4. Accordingly, in this particular example, as mentioned above, a single selected word line ($WL_k$) is chosen from the initially programmed portion 802*a* of the memory block (such that $WL_0 \leq WL_k \leq WL_N$, as indicated by the asterisk in table 910). Further, as set forth in line 912 of the supplemental "lookup" table 910, supplemental offset values are determined and stored with respect to each program state that is associated with the word line located within the initially programmed portion 802*a* (i.e., word lines $WL_0$ through $WL_N$) of memory block 800. Accordingly, with respect to the word lines $WL_0$ through $WL_N$, the supplemental offset values set forth in line 912 must be applied in conjunction with the initial offset values set forth in the initial "lookup" table 900. As such, the application of the supplemental offset values during a subsequent read operation allows for the accurate read determination despite any difference in the degree of the voltage shift ($\Delta V$) that is exhibited between the initially programmed portion 802*a* and the later programmed portion 802*b* of the memory block 800.

Figure 23A:
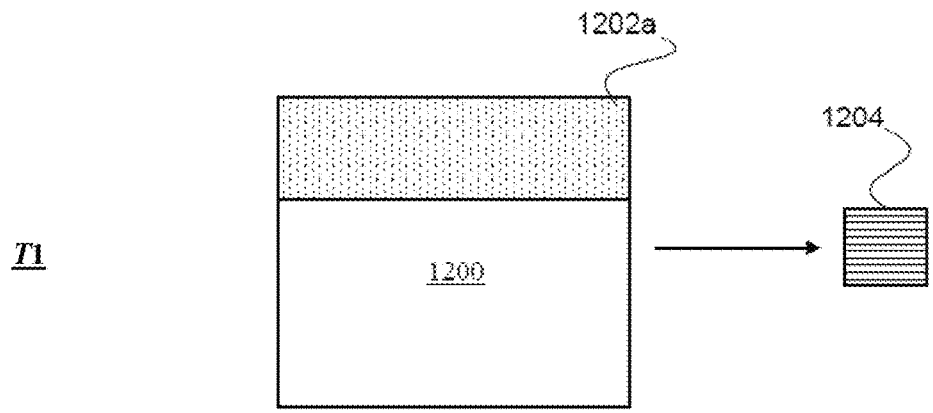
FIGS. 23A-23C graphically depict the generation of supplemental "lookup" tables over the course of a memory block that is programmed in multiple programming cycles before becoming fully programmed, in accordance with exemplary embodiments.
Figure 23B:
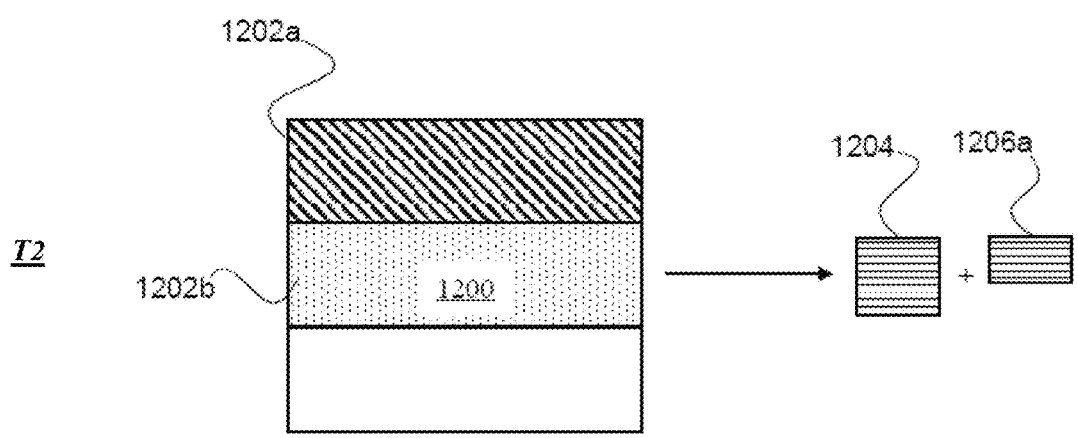
Figure 23C:
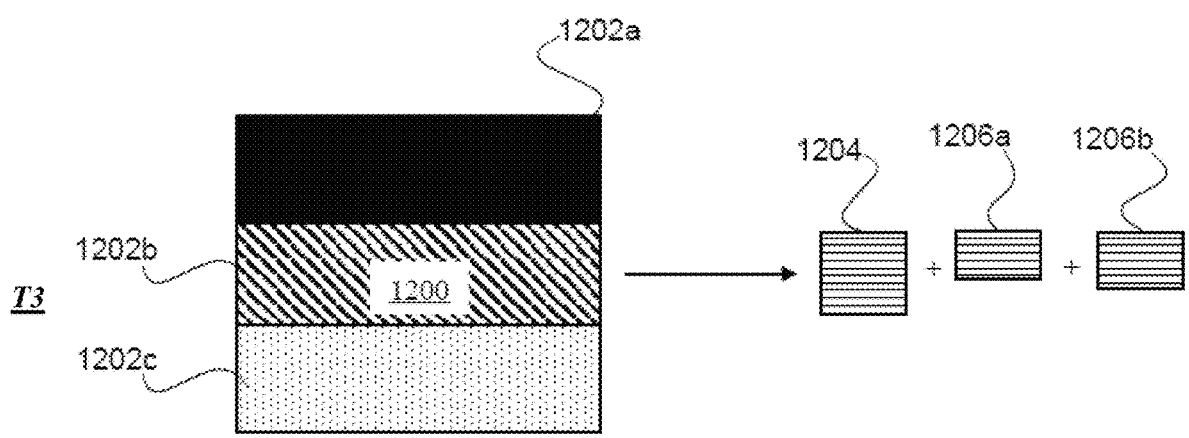

Despite the resulting improvements imparted by this mechanism with respect to, for example, the accuracy of a read operation, the generation and the storage of successive supplemental "lookup" tables in cases in which a subject memory structure becomes fully programmed (i.e., "closed") after multiple partial programming operations, may require an impractical (and in some cases, exponential) amount of memory storage to implement the mechanism. FIGS. 23A through 23C generally depict the potential for a significant memory storage challenge. Beginning at FIG. 23A, there is depicted a memory block 1200 as it might appear at a time, T1, following a programming operation in which only a portion 1202*a* of the memory block 1200 has been programmed. Accordingly, based upon the "time tag" read mechanism described above with respect to, for example, FIGS. 19 and 21, an associated pre-calibrated "lookup" table 1204 is also stored in connection with memory block 1200. Next, in FIG. 23B, the memory block 1200 is shown as it appears at a subsequent time, T2, in which a further portion 1202*b* has now been programmed. Still, the memory block 1200 is not fully programmed and, therefore, remains "open." As such, according to the mechanism that is described in detail above with respect to, for example, FIG. 21, a supplemental "lookup" table 1206*a* must be generated and also stored in connection with the memory block 1200. Further, depicted in FIG. 23C is the memory block 1200 as it later appears at a time, T3, in which the remaining portion 1202*c* of the memory block 1200 is now programmed. That is to say, at time 73, the memory block 1200 is now fully programmed (i.e., "closed"). However, once again, to account for the disparities between the portions 1202*a*, 1202*b*, and 1202*c* with respect to the experienced voltage shift ($\Delta V$) of the electron charges as a result of the gradual programming approach of the memory block 1200, a second supplemental "lookup" table 1206*b* is generated and stored at time T3 in connection with the memory block 1200. Therefore, one can see how quickly generation of the supplemental "lookup" tables may multiply with each programming cycle and how, as a result, the storage capacity needed to store the tables rapidly magnifies, particularly in a memory structure or memory device that comprises multiple memory blocks. Accordingly, it may be beneficial to employ a storage handling methodology that will conserve the storage capacity consumed.

Figure 24:
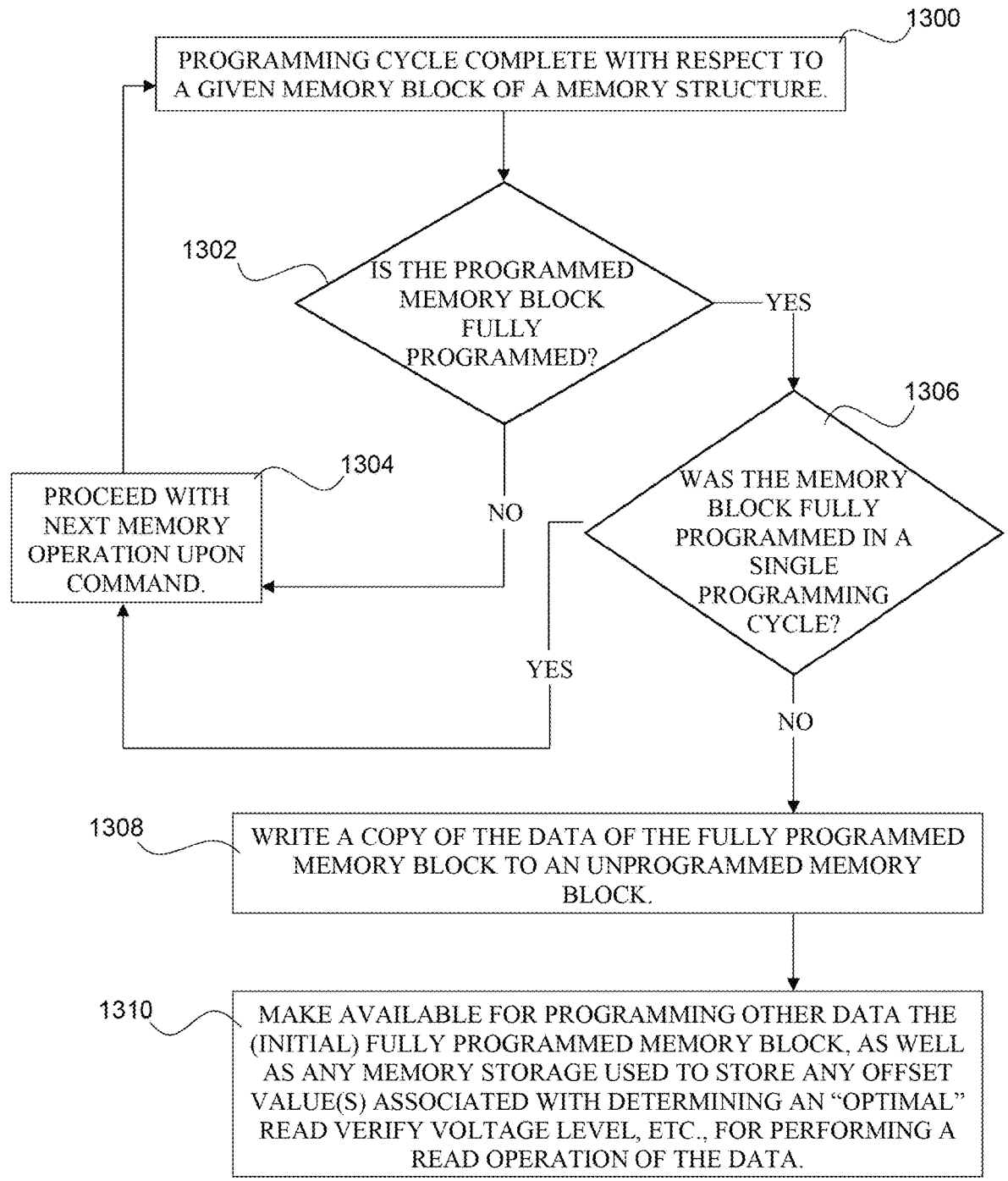
FIG. 24 is a flow diagram generally illustrating several steps for managing memory capacity, in accordance with exemplary embodiments.

Referring now to FIG. 24, a flow diagram is provided that outlines, in general terms, several steps of a storage handling methodology that aims to smartly manage movement of programmed data in view of storage requirements of the "time tag" read mechanism that is described above. Beginning at step 1300, a programming cycle is completed with respect to a given memory block of a memory structure. At this juncture (see step 1302), a determination is made as to whether the programmed memory block is fully programmed (i.e., "closed"). If the memory block is not fully programmed, the process awaits the next memory operation (e.g., programming operation, read operation, etc.) per command (see step 1304).

However, if it is determined (i.e., at step 1302) that the memory block is fully programmed, a next determination is made at step 1306. Specifically, it is ascertained as to whether the memory block was fully programmed in a single programming cycle. Now, if the memory block was fully programmed in a single programming cycle, the problematic issue of storing an ever-growing population of "lookup" tables is not present. Accordingly, the process merely awaits the next memory operation (see step 1304).

However, if it is determined that the memory block only became fully programmed following multiple partial programming operations, a copy of the data of the fully programmed memory block is transferred or written to an unprogrammed ("erased") memory block, thereby removing from the programmed data the differential impact (and corresponding supplemental "lookup" table(s)) to the voltage shift (ΔV) (to the stored electron charges) that was experienced across the initially programmed memory block (see step 1308). Immediately following the data transfer, or some time thereafter, the initially programmed memory block (as well as any other memory storage used to store the offset value(s) associated with, for example, determining an "optimal" read verify voltage level, etc., for performing a read operation of the data) may be completely erased, or otherwise made available for programming of other data (see step 1310). Accordingly, by utilizing this storage handling methodology to unburden the fully programmed data from the offset value data, the amount of storage capacity that is needed is significantly reduced.

The above discussion is meant to be illustrative of the principles and various embodiments of the present invention. Numerous variations and modifications will become apparent to those skilled in the art once the above disclosure is fully appreciated. For example, although on-memory controllers have been described as performing or controlling the methods that are described above, any processor executing software within a host system can perform the methods described above without departing from the scope of the disclosure. In particular, the methods and techniques described herein as performed in the on-memory controller (s), may also be performed in a host. Furthermore, the methods and concepts disclosed herein may be applied to other types of persistent memories other than flash. It is intended that the following claims be interpreted to embrace all such variations and modifications.

What is claimed is:

1. A method for performing a read memory operation with respect to a fully programmed memory structure that, initially, was partially programmed, the method comprising:
   selecting a word line located within an initially programmed portion of a non-volatile memory structure;
   applying a read memory algorithm with respect to the selected word line in the initially programmed portion to determine a first "optimal" read verify voltage level for each program state associated with the selected word line, wherein the read memory algorithm comprises a bit count scan;
   once the memory structure is fully programmed, applying the read memory algorithm with respect to the selected word line to determine a second "optimal" read verify voltage level for each program state associated with the selected word line for the fully programmed memory structure;
   for each program state that is associated with the selected word line, determining a difference between the first "optimal" read verify voltage level and the second "optimal" read verify voltage level as determined using the bit count scan, wherein the difference defines a supplemental offset value;
   determining an "optimal" read verify voltage level for each program state associated with each word line located within the initially programmed portion of the memory structure, wherein the "optimal" read verify voltage level is determined by applying the supplemental offset value in conjunction with an initial offset value defined in a pre-calibrated "lookup" table; and
   applying a read memory operation with respect to each word line located within the initially programmed portion of the memory structure, wherein the read memory operation is applied according to each determined "optimal" read verify voltage level.

2. The method according to claim 1, wherein the non-volatile memory structure comprises NAND-type memory cells.

3. The method according to claim 1, wherein the memory structure comprises the initially programmed portion and a later programmed portion, the method further comprising:
   determining an "optimal" read verify voltage level for each program state associated with each word line located within the later programmed portion of the memory structure, wherein the "optimal" read verify voltage level is determined by applying only the initial offset value; and
   applying the read memory operation with respect to each word line located within the later programmed portion of the memory structure, wherein the read memory operation is applied according to each determined "optimal" read verify voltage level.

4. The method according to claim 1, wherein the first and second "optimal" read verify voltage levels are determined, according to the bit count scan, by sweeping, with respect to each program state, a corresponding threshold voltage ($V_{th}$) distribution curve to detect a lowermost region of the curve.

5. The method according to claim 4, wherein each corresponding threshold voltage ($V_{th}$) distribution curve comprises an unintended voltage shift.

6. The method according to claim 1, wherein the selected word line is selected based at least in part on a relative location of the selected word line within the memory structure.

7. A memory controller, comprising:
   a communication pathway configured to couple to a fully programmed non-volatile memory structure that, initially, was partially programmed;
   the memory controller configured to:
      select a word line located within an initially programmed portion of the non-volatile memory structure;
      apply a read memory algorithm with respect to the selected word line in the initially programmed portion to determine a first "optimal" read verify voltage level for each program state that is associated with the selected word line, wherein the read memory algorithm comprises a bit count scan;
      once the memory structure is fully programmed, apply the read memory algorithm with respect to the selected word line to determine a second "optimal" read verify voltage level for each program state that is associated with the selected word line for the fully programmed structure;
      for each program state associated with the selected word line, determine a difference between the first "optimal" read verify voltage level and the second "optimal" read verify voltage level as determined using the bit count scan, wherein the difference defines a supplemental offset value;

determine an "optimal" read verify voltage level for each program state associated with each word line located within the initially programmed portion of the memory structure, wherein the "optimal" read verify voltage level is determined by applying the supplemental offset value in conjunction with an initial offset value defined in a pre-calibrated "lookup" table; and apply a read memory operation with respect to each word line located within the initially programmed portion of the memory structure, wherein the read memory operation is applied according to each determined "optimal" read verify voltage level.

8. The memory controller according to claim 7, wherein the non-volatile memory structure comprises NAND-type memory cells.

9. The memory controller according to claim 7, wherein the memory structure comprises the initially programmed portion and a later programmed portion, the memory controller further configured to:

determine an "optimal" read verify voltage level for each program state associated with each word line located within the later programmed portion of the memory structure, wherein the "optimal" read verify voltage level is determined by applying only the initial offset value; and apply the read memory operation with respect to each word line located within the later programmed portion of the memory structure, wherein the read memory operation is applied according to each determined "optimal" read verify voltage level.

10. The memory controller according to claim 7, wherein the first and second "optimal" read verify voltage levels are determined, according to the bit count scan, by sweeping, with respect to each program state, a corresponding threshold voltage ($V_{th}$) distribution curve to detect a lowermost region of the curve.

11. The memory controller according to claim 10, wherein each corresponding threshold voltage ($V_{th}$) distribution curve comprises an unintended voltage shift.

12. The memory controller according to claim 7, wherein the selected word line is selected based at least in part on a relative location of the selected word line within the memory structure.

13. A non-volatile memory system, comprising:

a fully programmed memory structure comprising a population of NAND-type memory cells, wherein the memory structure was initially partially programmed; and a memory controller coupled to the memory structure and:

selecting a word line located within an initially programmed portion of the memory structure;

applying a read memory algorithm with respect to the selected word line in the initially programmed portion to determine a first "optimal" read verify voltage level for each program state associated with the selected word line, wherein the read memory algorithm comprises a bit count scan;

once the memory structure is fully programmed, applying the read memory algorithm with respect to the selected word line to determine a second "optimal" read verify voltage level for each program state associated with the selected word line for the fully programmed memory structure;

for each program state that is associated with the selected word line, determining a difference between the first "optimal" read verify voltage level and the second "optimal" read verify voltage level as determined using the bit count scan, wherein the difference defines a supplemental offset value;

determining an "optimal" read verify voltage level for each program state associated with each word line located within the initially programmed portion of the memory structure, wherein the "optimal" read verify voltage level is determined by applying the supplemental offset value in conjunction with an initial offset value defined in a pre-calibrated "lookup" table; and applying a read memory operation with respect to each word line located within the initially programmed portion of the memory structure, wherein the read memory operation is applied according to each determined "optimal" read verify voltage level.

14. The non-volatile memory system according to claim 13, wherein the memory structure comprises the initially programmed portion and a later programmed portion, the memory controller:

determining an "optimal" read verify voltage level for each program state associated with each word line located within the later programmed portion of the memory structure, wherein the "optimal" read verify voltage level is determined by applying only the initial offset value; and applying a read memory operation with respect to each word line located within the later programmed portion of the memory structure, wherein the read memory operation is applied according to each determined "optimal" read verify voltage level.

15. The non-volatile memory system according to claim 13, wherein the first and second "optimal" read verify voltage levels are determined, according to the bit count scan, by sweeping, with respect to each program state, a corresponding threshold voltage ($V_{th}$) distribution curve to detect a lowermost region of the curve.

16. The non-volatile memory system according to claim 15, wherein each corresponding threshold voltage ($V_{th}$) distribution curve comprises an unintended voltage shift.

17. The non-volatile memory system according to claim 13, wherein the selected word line is selected based at least in part on a relative location of the selected word line within the memory structure.

* * * * *